(12) United States Patent
Barchine

(10) Patent No.: US 12,091,915 B2
(45) Date of Patent: Sep. 17, 2024

(54) SWITCHABLE LOCKING DEVICE

(71) Applicant: Alejandro Barchine, Miami Beach, FL (US)

(72) Inventor: Alejandro Barchine, Miami Beach, FL (US)

(*) Notice: Subject to any disclaimer, the term of this patent is extended or adjusted under 35 U.S.C. 154(b) by 1178 days.

(21) Appl. No.: 16/817,520

(22) Filed: Mar. 12, 2020

(65) Prior Publication Data
US 2020/0291722 A1    Sep. 17, 2020

Related U.S. Application Data

(60) Provisional application No. 62/816,947, filed on Mar. 12, 2019.

(51) Int. Cl.
| | | |
|---|---|---|
| E06C 1/383 | (2006.01) | |
| E06C 7/50 | (2006.01) | |
| F16H 35/00 | (2006.01) | |

(52) U.S. Cl.
CPC .......... E06C 1/383 (2013.01); E06C 7/50 (2013.01); *F16H 2035/006* (2013.01)

(58) Field of Classification Search
CPC .................................. E06C 7/50; E06C 1/383
USPC ......................................................... 16/330
See application file for complete search history.

(56) References Cited

U.S. PATENT DOCUMENTS

| | | | | |
|---|---|---|---|---|
| 4,493,392 A * | 1/1985 | Alimbau Marques | .... | E06C 1/56 182/27 |
| 4,666,328 A * | 5/1987 | Ryu | .......... | E06C 1/32 403/92 |
| 4,842,098 A * | 6/1989 | Yuen | .......... | E06C 1/32 182/2.4 |
| 6,343,406 B1 * | 2/2002 | Yeh | .......... | E06C 1/32 182/163 |
| 6,711,780 B2 * | 3/2004 | Lee | .......... | E06C 1/32 16/334 |
| 7,882,930 B2 * | 2/2011 | Parker | .......... | G05G 1/082 182/146 |
| 8,341,806 B2 * | 1/2013 | Parker | .......... | A47C 12/00 16/349 |
| 8,732,906 B1 * | 5/2014 | Van Gennep | ....... | E05D 11/1007 16/229 |
| 8,984,718 B2 * | 3/2015 | Ejdehag | .......... | F16C 11/10 16/436 |

(Continued)

*Primary Examiner* — Colby M Hansen
(74) *Attorney, Agent, or Firm* — DP IP GROUP; Franco De Liguori

(57) ABSTRACT

A lock device has a pair of locking elements with internal locking teeth, a pair of shafts with external locking teeth configured for meshing engagement with the internal locking teeth, a pair of housing portions configured to receive and retain the respective shafts, and a case configured to receive the locking elements. The locking elements are permitted to undergo sliding movement within the case between first and second states of the lock device. In the first state, the internal locking teeth of the locking elements are disposed in respective meshing engagement with the external locking teeth of the shafts so that the case cannot undergo rotational movement relative to the shafts. In the second state, the internal locking teeth of the locking elements are not disposed in meshing engagement with the external locking teeth of the shafts so that the case can undergo rotational movement relative to the shafts.

20 Claims, 25 Drawing Sheets

(56) References Cited

U.S. PATENT DOCUMENTS

2010/0218344 A1* 9/2010 Van Gennep ....... E05D 11/1007
16/327

* cited by examiner

SWITCHABLE LOCKING DEVICE

RELATED APPLICATION

This application claims the benefit of U.S. Provisional Patent Application No. 62/816,947, filed on Mar. 12, 2019.

TECHNICAL FIELD

The present disclosure relates to locking devices, and more specifically to a switchable locking device. The present disclosure also relates to various arrangements and systems including the switchable locking device, such as a transfer gearbox for 2WD to 4WD conversion and a stop or lock device for a static position, such as a lock device for a folding multi-position ladder, as well as for different types of mechanisms employing articulated arms and related mechanical applications.

BACKGROUND

Switchable locking devices are used for many mechanical applications. However, existing switchable locking devices are inefficient in operation and typically require a large space when implemented in mechanical applications, which often increases the overall weight of the resulting device. Conventional switchable locking devices are also not adapted or configured for various types of mechanical applications.

Therefore, it is desirable to provide a switchable locking device which exhibits high operational efficiency, is adapted for various types of mechanical applications, and is configured to reduce the space and overall weight required for various types of mechanical applications.

SUMMARY

A switchable locking device is described. The switchable locking device includes an internal lock and an external case configured to receive the internal lock. The external case is configured to be drivingly connected to and disconnected from an external rotational shaft via the internal lock. When received within the external case, the internal lock is configured to be selectively switched between an "ON" state and an "OFF" state. In the "ON" state of the internal lock, the external case is connected to the external rotational shaft for undergoing rotation therewith (i.e., the external case transmits the rotation of the external rotation shaft). In the "OFF" state of the internal lock, the external case is disconnected from the external rotational shaft and does not undergo rotation therewith (i.e., the external case does not transmit the rotation of the external rotation shaft).

According to a feature of the present disclosure, the internal lock and external case are configured so as to allow the internal lock to slide within and relative to the external case to be selectively placed between the "ON" and "OFF" states.

The internal lock is provided with a plurality of external locking teeth and the external case is provided with a plurality of locking slots for meshing engagement with the respective external locking teeth of the internal lock. The meshing engagement between the external locking teeth and locking slots is such that the locking teeth are configured to slide along the respective locking slots to selectively place the internal lock between the "ON" and "OFF" states.

The internal lock can be readily switched to the "ON" state by sliding the internal lock relative to the external case to a first position in which the internal lock is brought into engagement with the external rotational shaft to transmit rotational movement of the external rotational shaft to the external case. The internal lock can be readily switched from the "ON" state to the "OFF" state by sliding the internal lock relative to the external case to a second position in which the internal lock is disengaged from the external rotational shaft so that the rotational movement of the external rotational shaft is not transmitted to the external case.

The internal lock has a tubular configuration and is provided with a plurality of internal lock teeth for meshing engagement with respective external locking teeth of the external rotational shaft when the internal lock is in the first position relative to the external case (i.e., when the internal lock is placed in the "ON" state).

In one embodiment, the internal lock is switched between the "ON" state and the "OFF" state by a hydraulic system (hydraulic pressure device) incorporated to the external case and the internal lock. Alternatively, the internal lock is switched between the "ON" state and the "OFF" state by an electro-magnetic system incorporated to the external case and the internal lock.

In one application according to the present disclosure, the switchable locking device is a transfer gearbox for 2WD to 4WD conversion.

In another application according to the present disclosure, the switchable locking device is used like a stop or lock device for a static position. In one implementation, the switchable locking device is incorporated in a folding multi-position ladder.

In another application according to the present disclosure, the switchable locking device is applied to articulated components configured to undergo movement relative one another.

DETAILED DESCRIPTION

The present disclosure now will be described more fully hereinafter with reference to the accompanying drawings, in which exemplary aspects and embodiments of the disclosure are shown. This disclosure may, however, be embodied in many different forms and should not be construed as limited to the embodiments set forth herein; rather, these embodiments are provided so that this disclosure will be thorough and complete, and will fully convey the scope of the disclosure to those skilled in the art.

Figure 1:
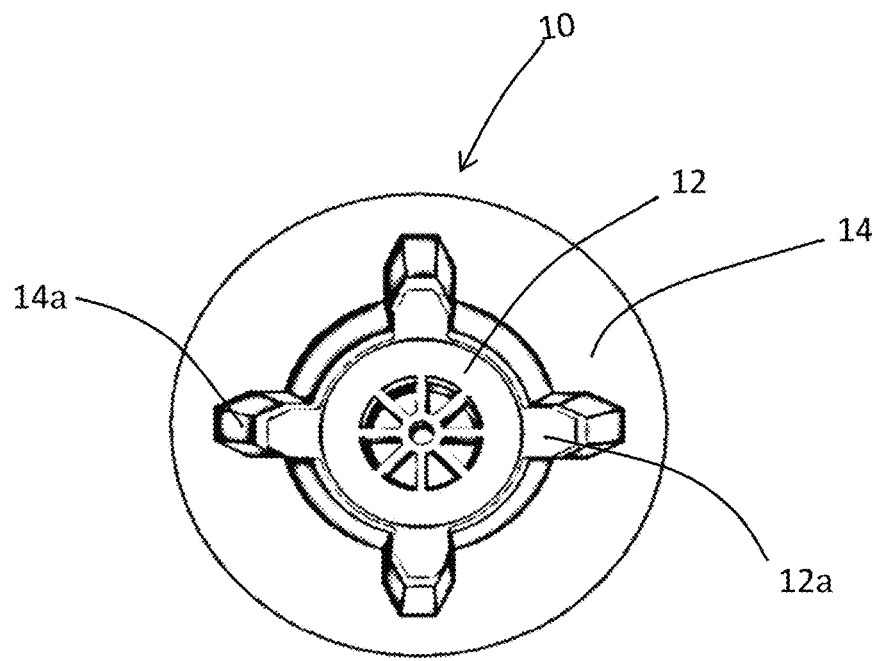
FIG. 1 is a front view of a switchable locking device according to an embodiment of the present disclosure.
Figure 2:
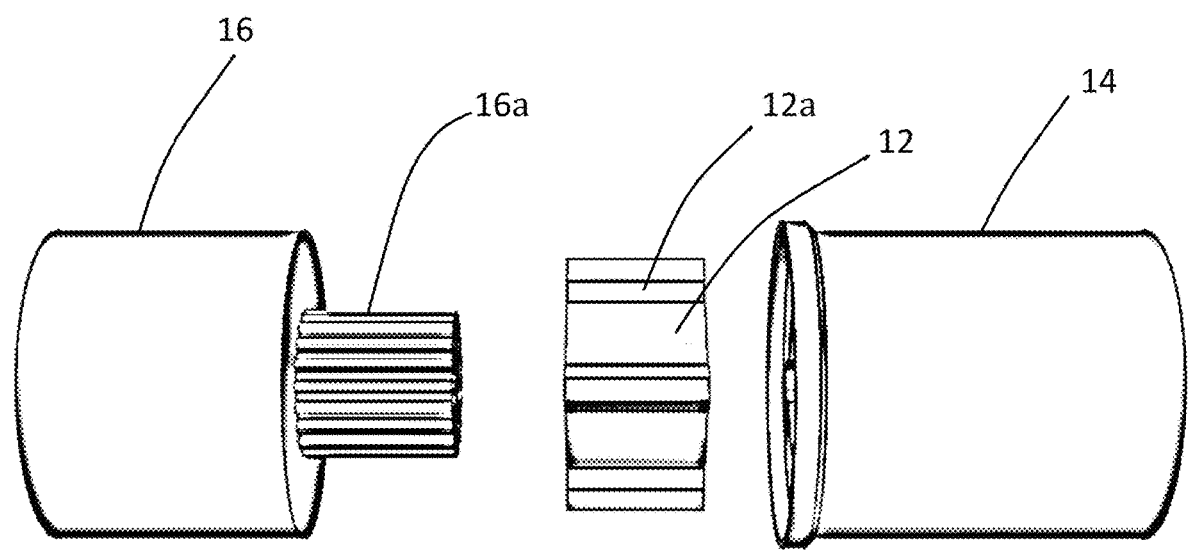
FIG. 2 is a right-side exploded view showing the internal lock and external case of the switchable locking device along with an external rotational shaft to which the external case is configured to be connected to and disconnected from via the internal lock.
Figure 3:
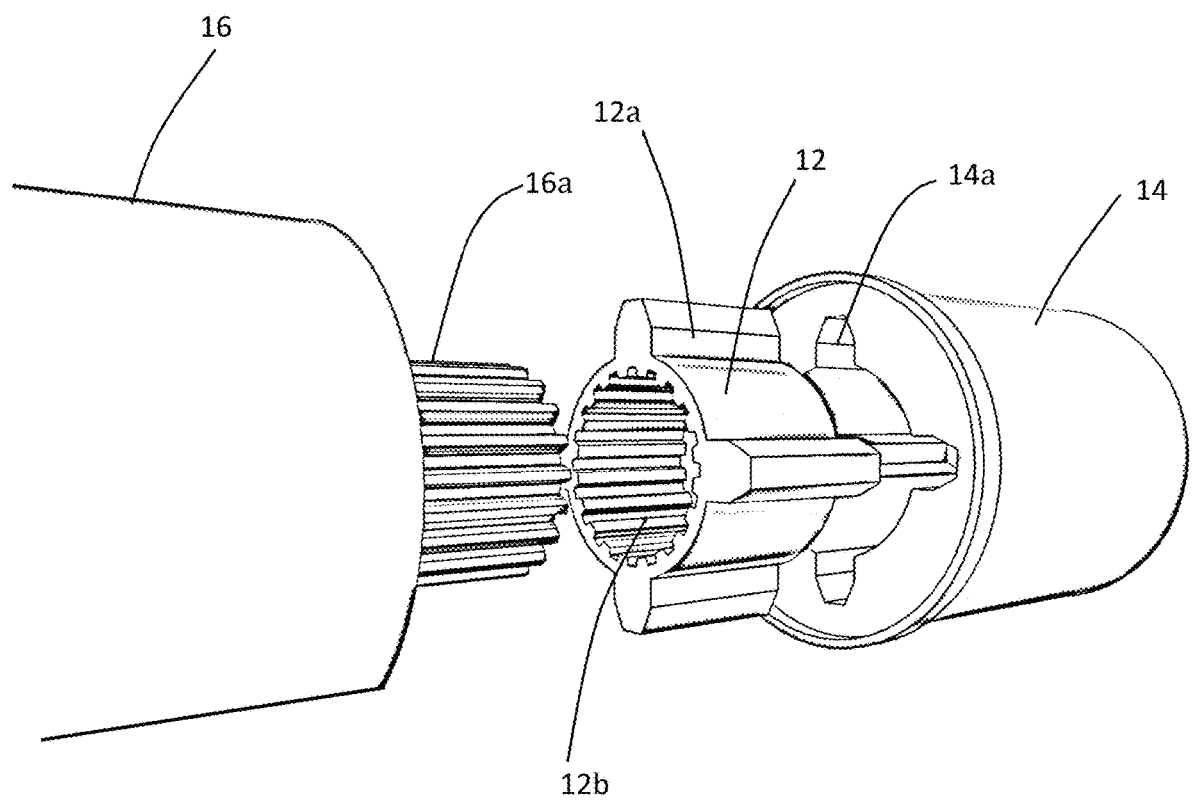
FIG. 3 is a perspective of the exploded view in FIG. 2.
Figure 4:
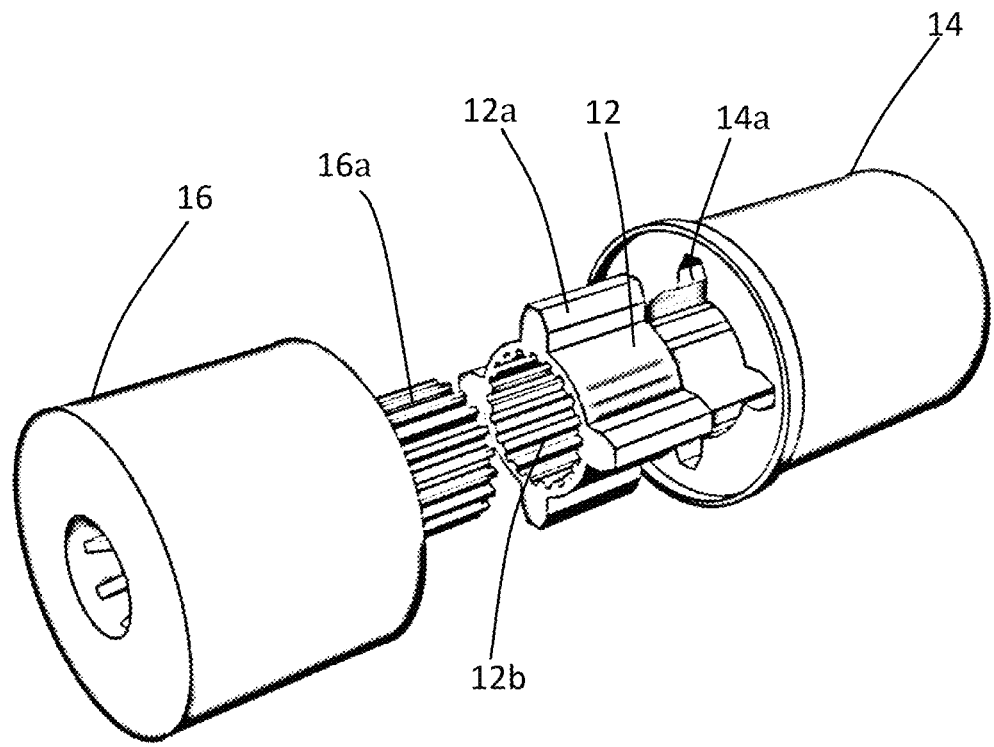
FIG. 4 is another perspective of the exploded view in FIG. 2.
Figure 5:
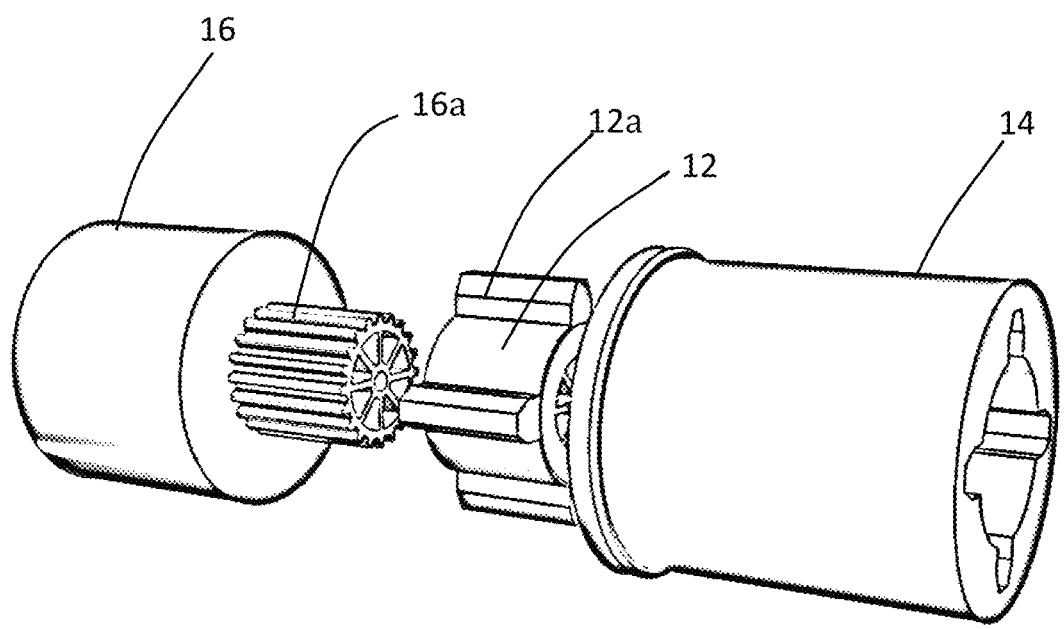
FIG. 5 is another perspective of the exploded view in FIG. 2.
Figure 6:
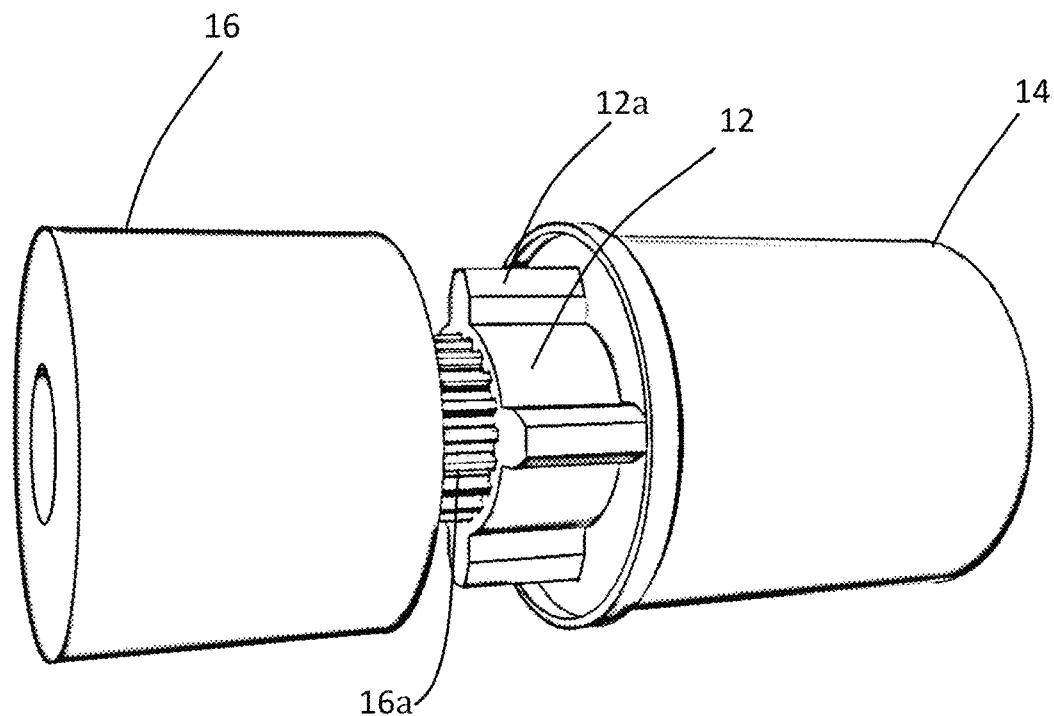
FIG. 6 is a side perspective view showing the assembly of the internal lock relative to the external case and the external rotational shaft.
Figure 7:
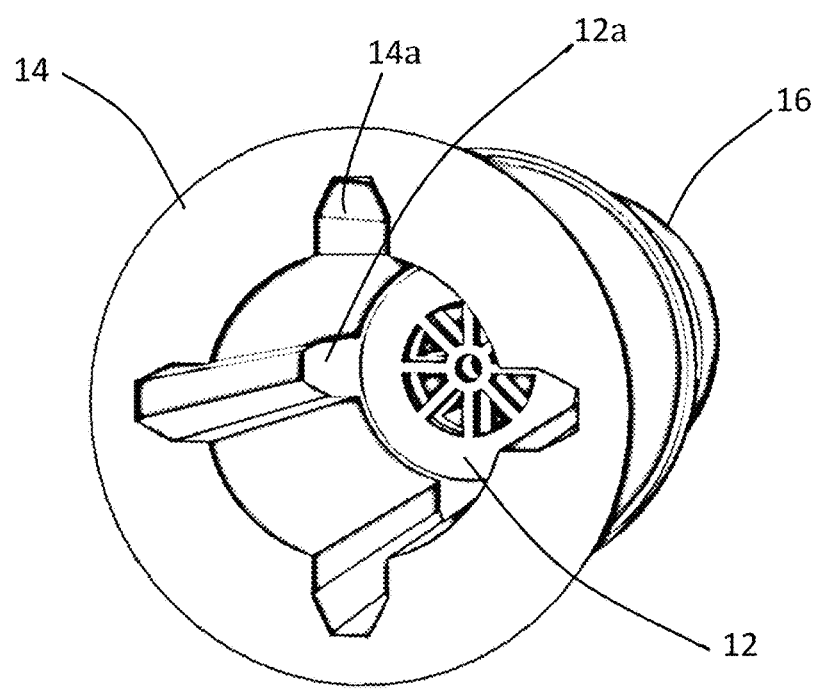
FIG. 7 is rear perspective view of the assembly in FIG. 6.
Figure 8:
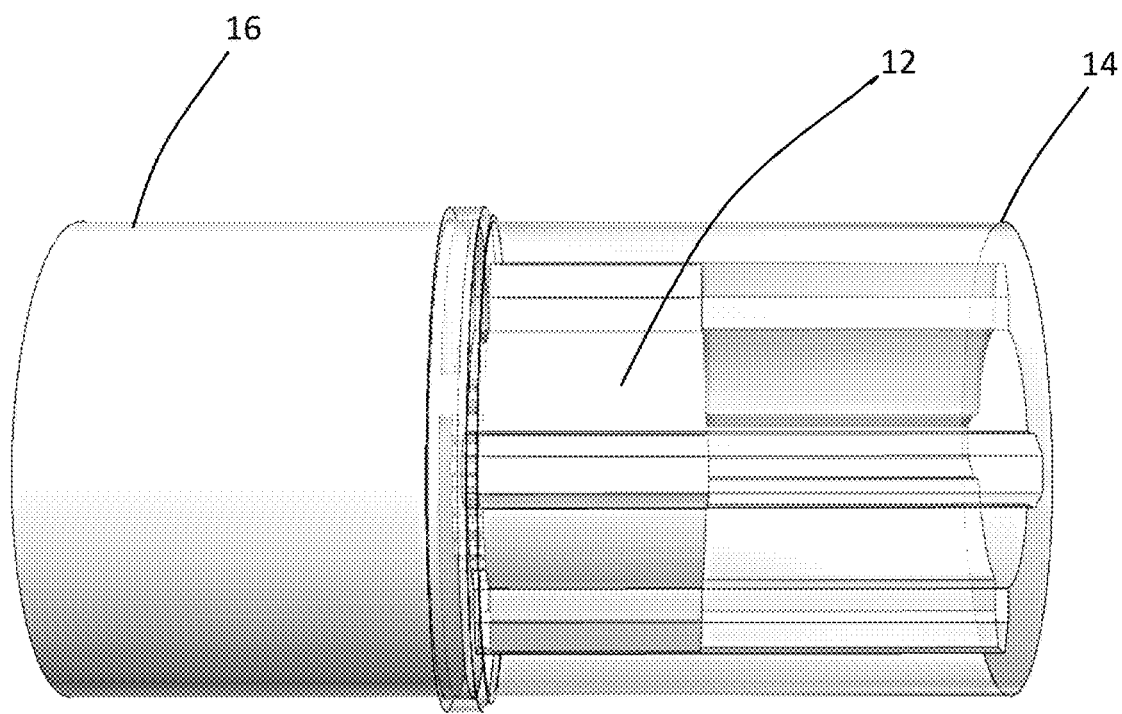
FIG. 8 is a right-side view showing the switchable locking device in which the internal lock switched to the "ON" state, and with the external case being depicted in semi-transparent form to allow observation of the internal lock.
Figure 9:
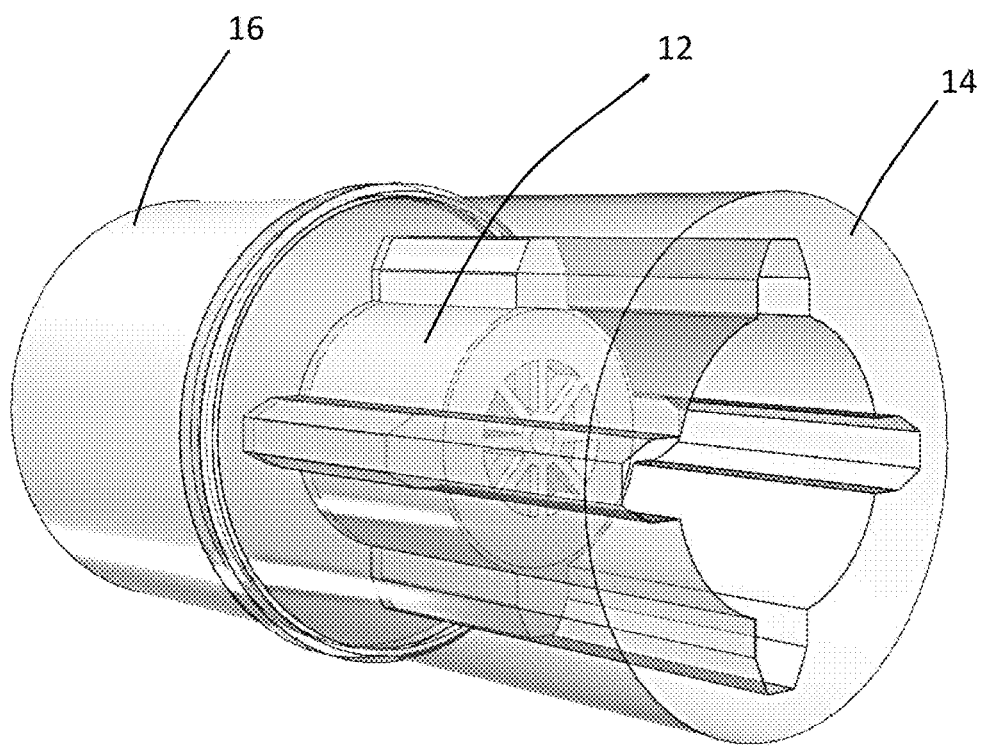
FIG. 9 is a rear perspective view of FIG. 8.
Figure 10:
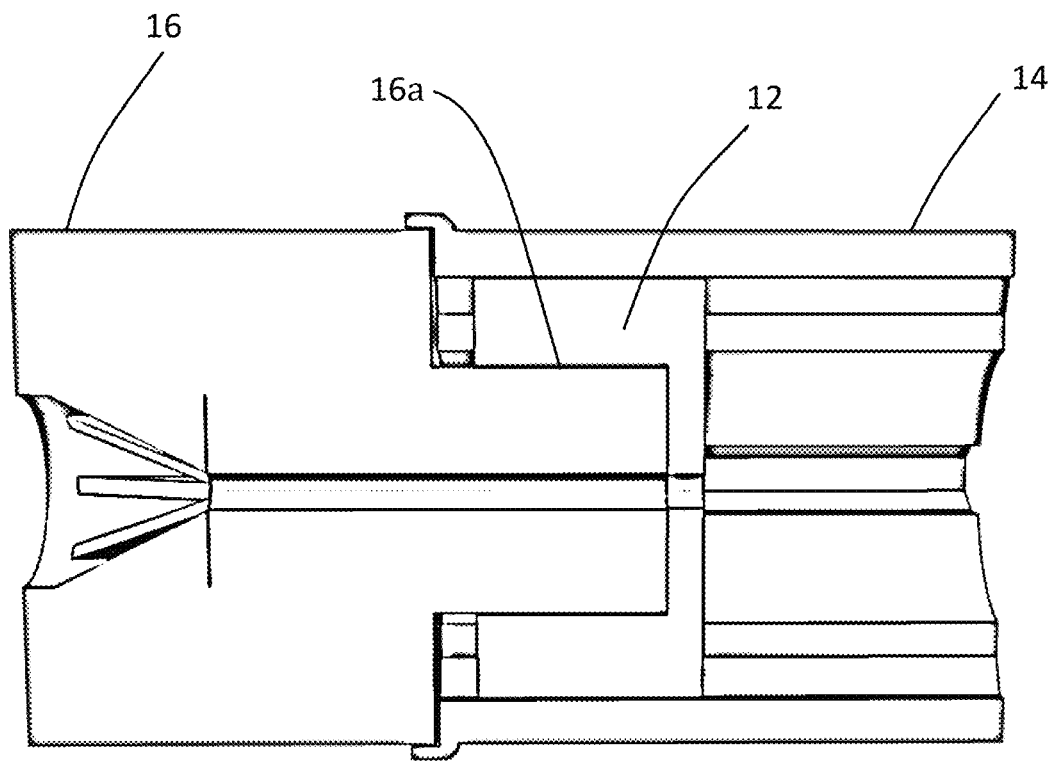
FIG. 10 is a cross-sectional side view taken along a horizontal line cutting through the center of the device shown in FIG. 8.
Figure 11:
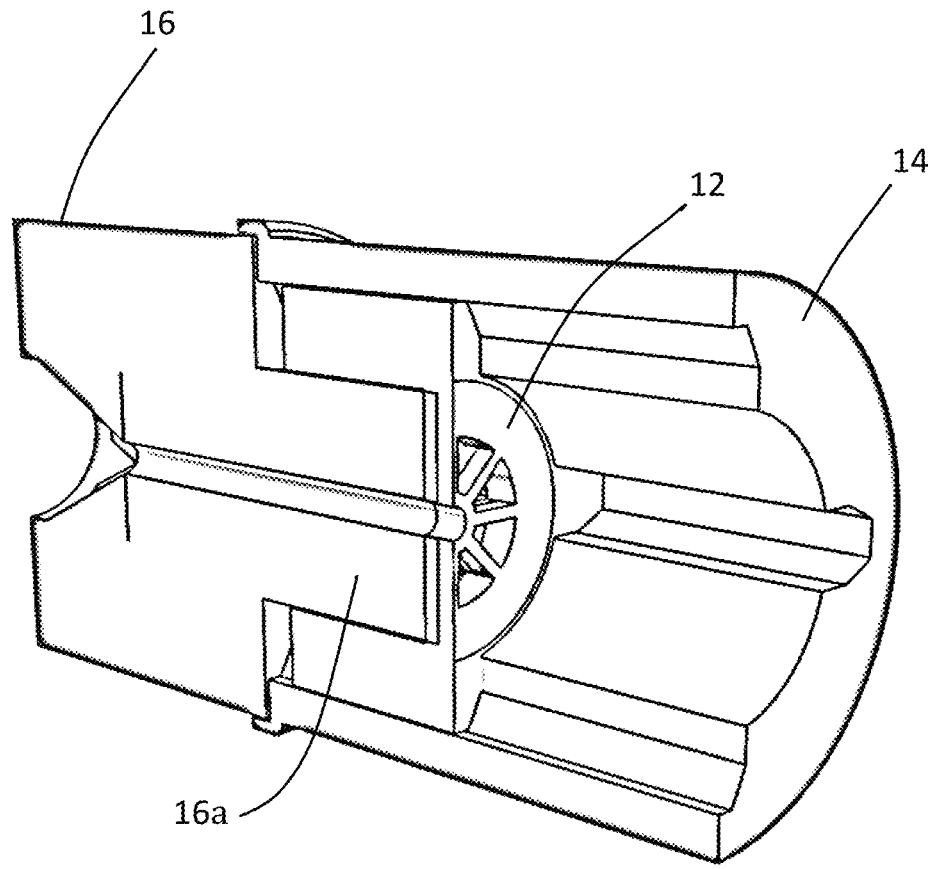
FIG. 11 is a rear cross-sectional perspective view of FIG. 10.
Figure 12:
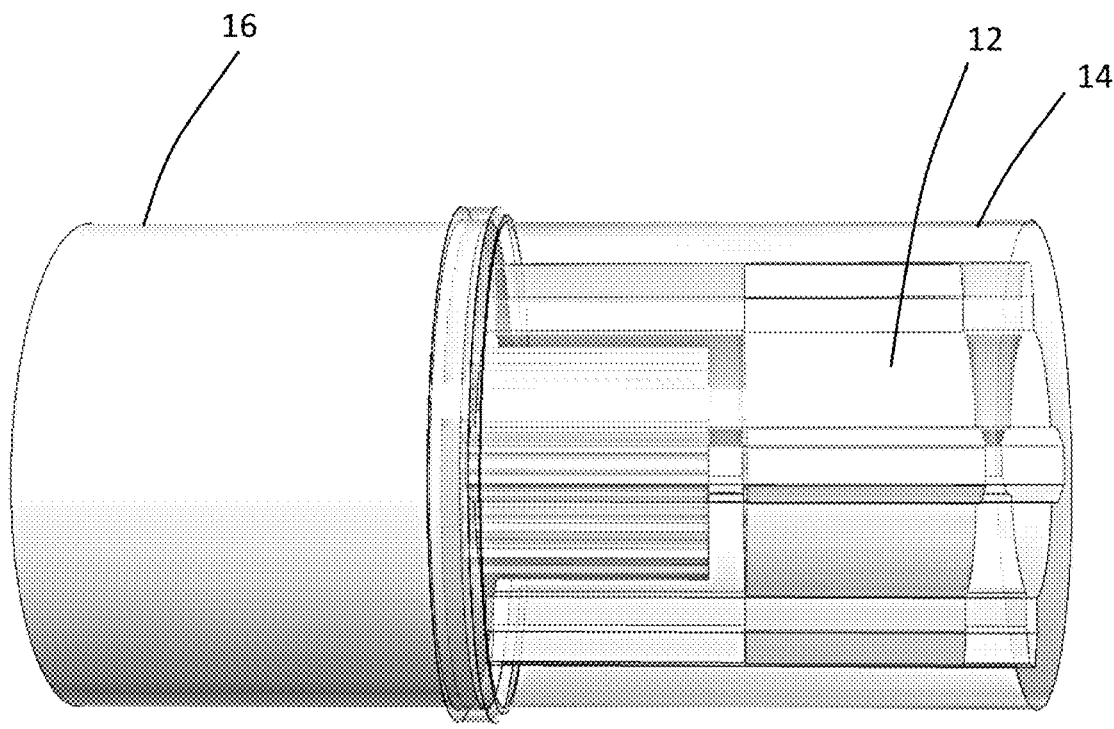
FIG. 12 is a right-side view showing the switchable locking device in which the internal lock switched to the "OFF" state, and with the external case being depicted in semi-transparent form to allow observation of the internal lock.
Figure 13:
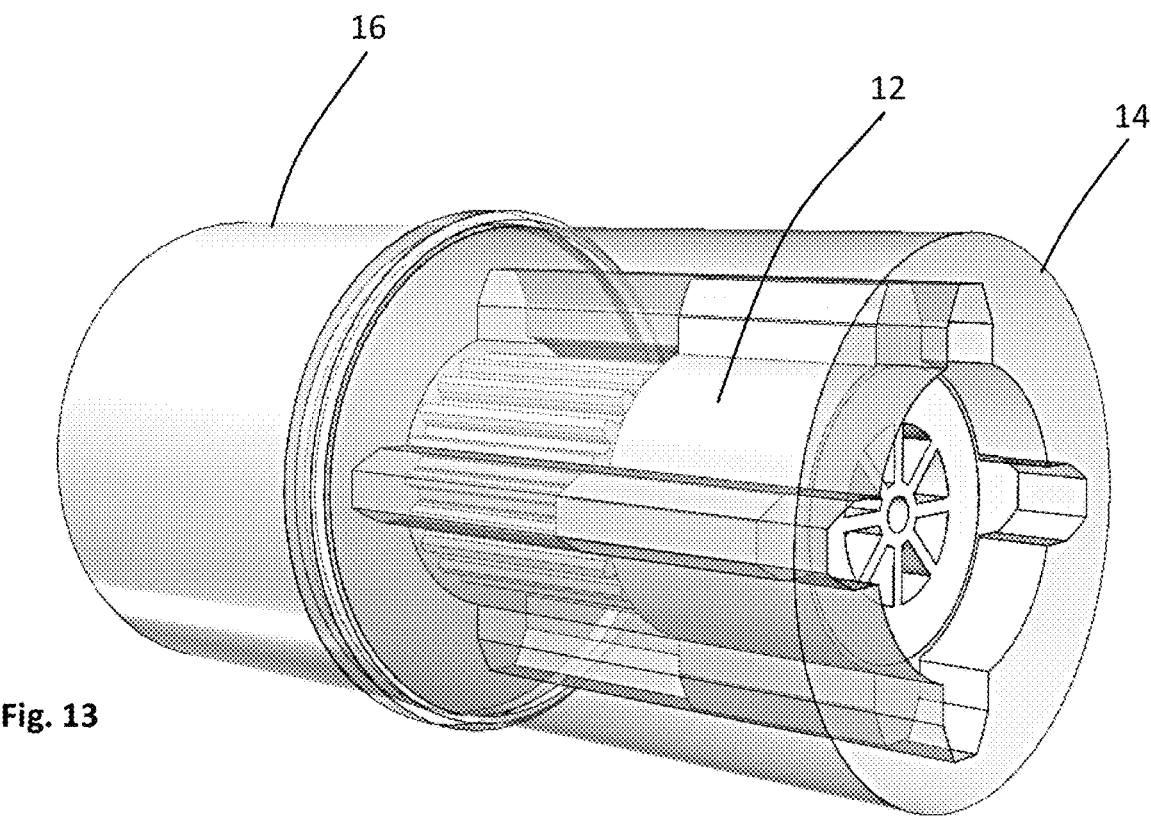
FIG. 13 is a rear perspective view of FIG. 12.
Figure 14:
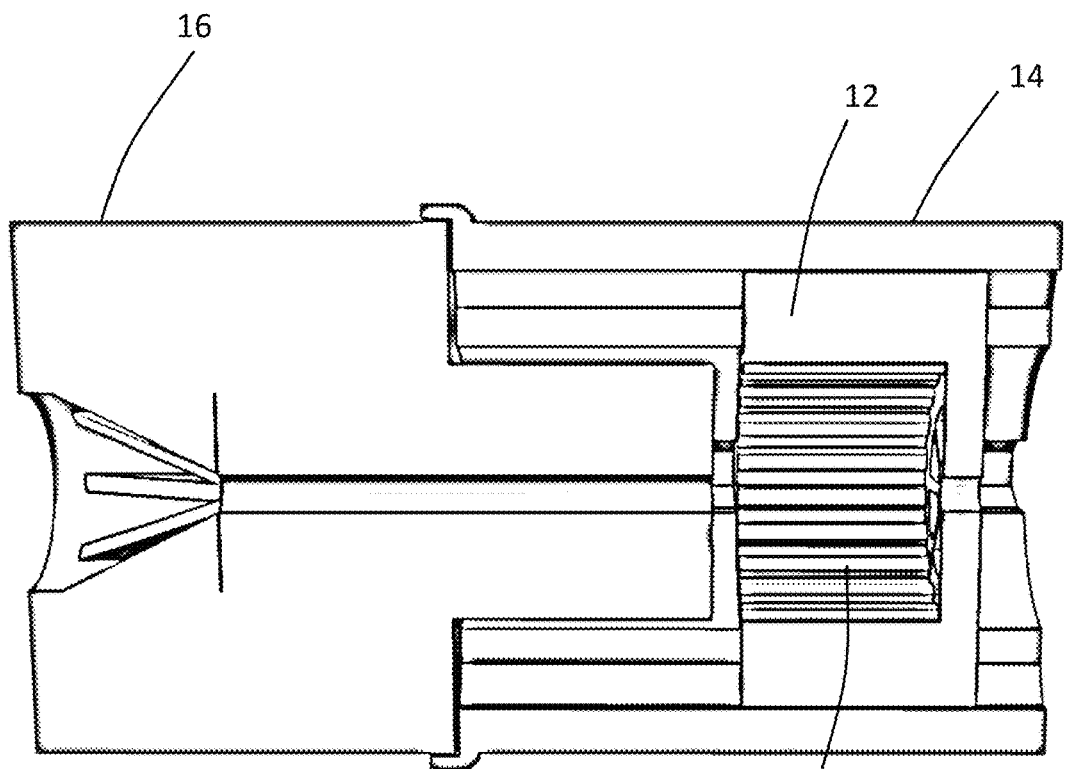
FIG. 14 is a cross-sectional side view taken along a horizontal line cutting through the center of the device shown in FIG. 12.
Figure 15:
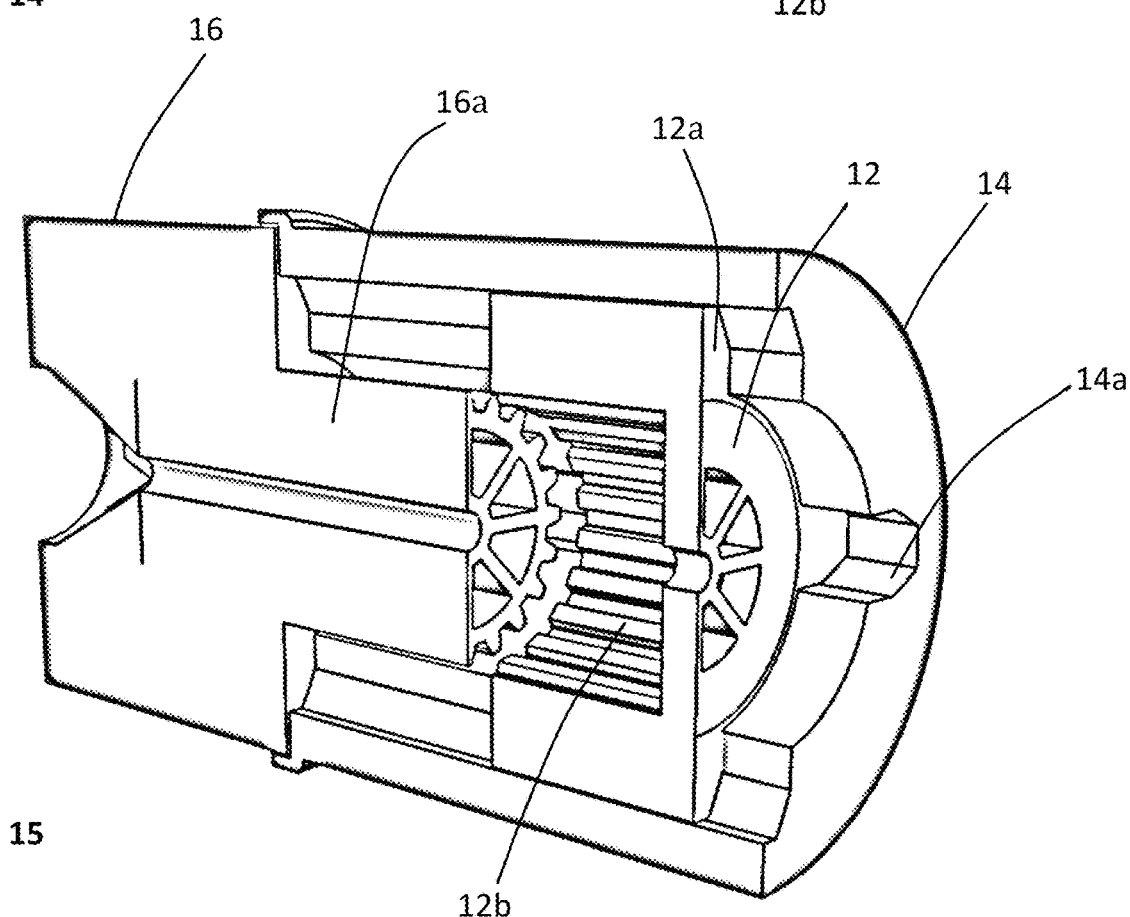
FIG. 15 is a rear cross-sectional perspective view of FIG. 14.

FIGS. 1-7 show various front, right side, exploded, and perspective views illustrating a switchable locking device, generally designated at 10, according to an embodiment of the present disclosure. As shown in FIG. 1, switchable locking device 10 includes a lock connector or switchable lock 12 (hereinafter also "internal lock") and an external lock or output shaft 14 (hereinafter also "external case") configured to receive internal lock 12. Internal lock 12 is provided with external locking teeth 12a and external case 14 is provided with slots 14a for meshing engagement with respective external locking teeth 12a of internal lock 12. Internal lock 12 and external case 14 are configured so as to allow the internal lock 12 to slide within and relative to external case 14. Internal lock 12 has a tubular configuration and is provided with internal locking teeth 12a.

Referring to FIGS. 2-6, external case 14 is configured to be drivingly connected to and disconnected from a main shaft 16 (hereinafter also "external rotational shaft") via internal lock 12. The driving connection or engagement is accomplished by bringing internal locking teeth 12a of internal lock 12 into meshing engagement with external locking teeth 16a of main shaft 16.

When received within external case 14, internal lock 12 is configured to be selectively switched between an "ON" state and an "OFF" state. In the "ON" state of internal lock 12, external case 14 is connected to main shaft 16 for undergoing rotation therewith (i.e., external case 14 transmits the rotation of main shaft 16). In this "ON" state configuration, external locking teeth 12a of internal lock 12 engage slots 14a of external case 14, and internal locking teeth 12b of internal lock 12 engage external locking teeth 16a of main shaft 16. In the "OFF" state of internal lock 12, external case 14 is disconnected from main shaft 16 and does not undergo rotation therewith (i.e., external case 14 does not transmit the rotation of main 16). In this "OFF" state configuration, external locking teeth 12a of internal lock 12 continue to engage slots 14a of external case 14, however, internal locking teeth 12b of internal lock 12 are disengaged from external locking teeth 16a of main shaft 16. Stated otherwise, in the "OFF" state, external case 14 can rotate freely.

The disengagement of internal locking teeth 12b from external locking teeth 16a described above is accomplished by sliding movement of internal lock 12 within and relative to external case 14. Thus, according to a feature of the present disclosure, internal lock 12 and external case 14 are configured so as to allow internal lock 12 to slide within and relative to external case 14 to selectively place internal lock 12 between the "ON" and "OFF" states.

More specifically, internal lock 12 can be readily switched to the "ON" state by sliding internal lock 12 relative to external case 14 to a first position within external case 14 in which internal locking teeth 12b of internal lock 12 are brought into meshing engagement with external locking teeth 16a of external rotational shaft 16 to transmit rotational movement of external rotational shaft 16 to external case 14 via internal lock 12. Internal lock 12 can be readily switched from the "ON" state to the "OFF" state by sliding internal lock 12 relative to external case 14 to a second position within external case 14 until internal locking teeth 12b of internal lock 12 disengage from external locking teeth 16a of external rotational shaft so that rotational movement of external rotational shaft 16 is not transmitted to external case 14 via internal lock 12.

FIGS. 8-11 show various right side, rear, perspective and cross-sectional views of switchable locking device 10 in which internal lock 12 is in the "ON" state (i.e., internal lock 12 is connected to external rotational shaft 16). FIGS. 12-15 show various right side, rear, perspective and cross-sectional views of switchable locking device 10 in which internal lock 12 is in the "OFF" state (i.e., internal lock 12 is disconnected from external rotational shaft 16), thereby enabling external case 14 to rotate freely. In FIGS. 8, 9, 12 and 13, external case 14 is depicted in semi-transparent form to allow observation of internal lock 12.

It will be appreciated that switchable locking device 10 is readably switchable "ON" and "OFF" as described above to connect one lock device (i.e., external case 14) to another (i.e., external rotational shaft 16). The configuration (e.g., shape) of switchable locking device 10, including internal lock 12 positionable inside of external case 14 and adapted for sliding movement therein to achieve the "ON" and "OFF" states, effectively reduces the space required for this type of mechanical application, thus reducing the overall weight of the resulting mechanical system in which switchable locking device 10 is applied. Furthermore, since the gear connection between internal lock 12 and external rotational shaft 16 is internal (i.e., inside of external case 14), the resulting mechanical system is able to operate with high efficiency, particularly because it results in a coupling configured to operate as one single, integral piece.

Figure 16:
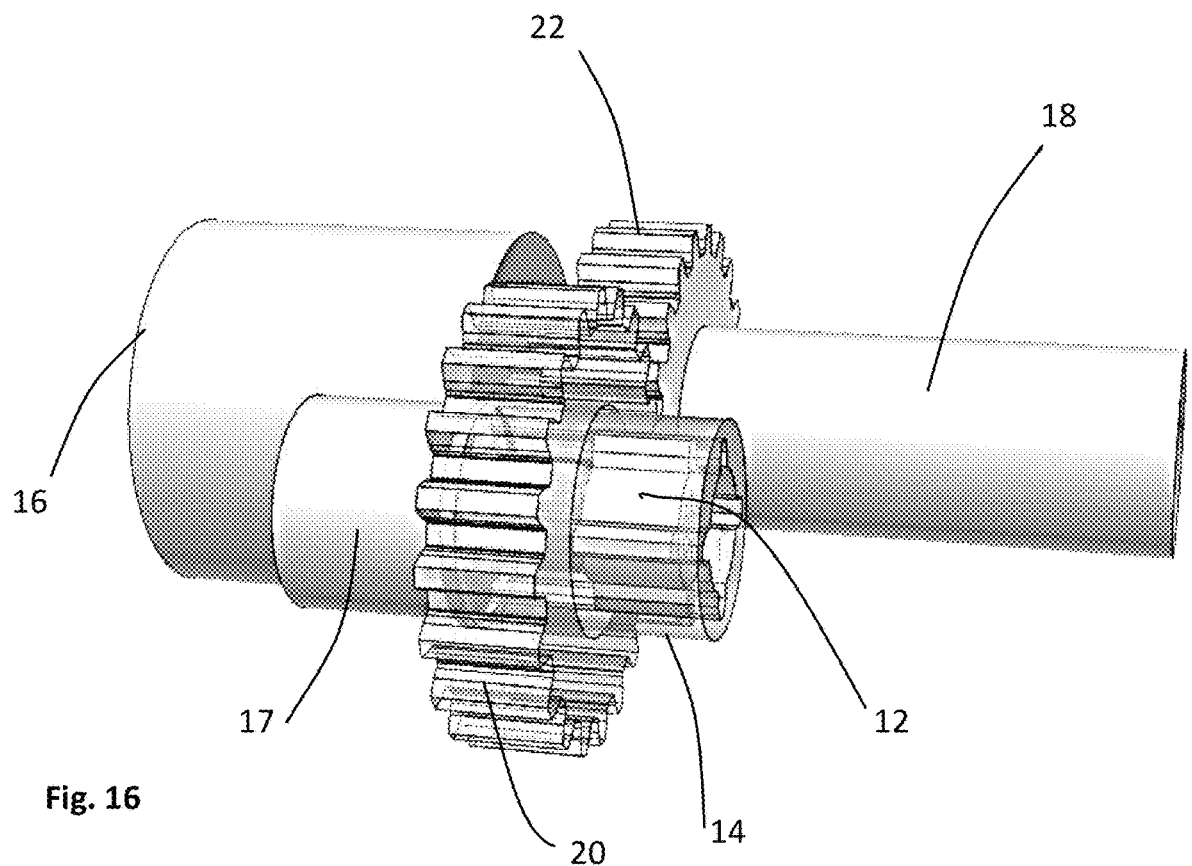
FIG. 16 is a side perspective view illustrating an application of the switchable locking device as a transfer gear box for 2WD to 4WD conversion.
Figure 17:
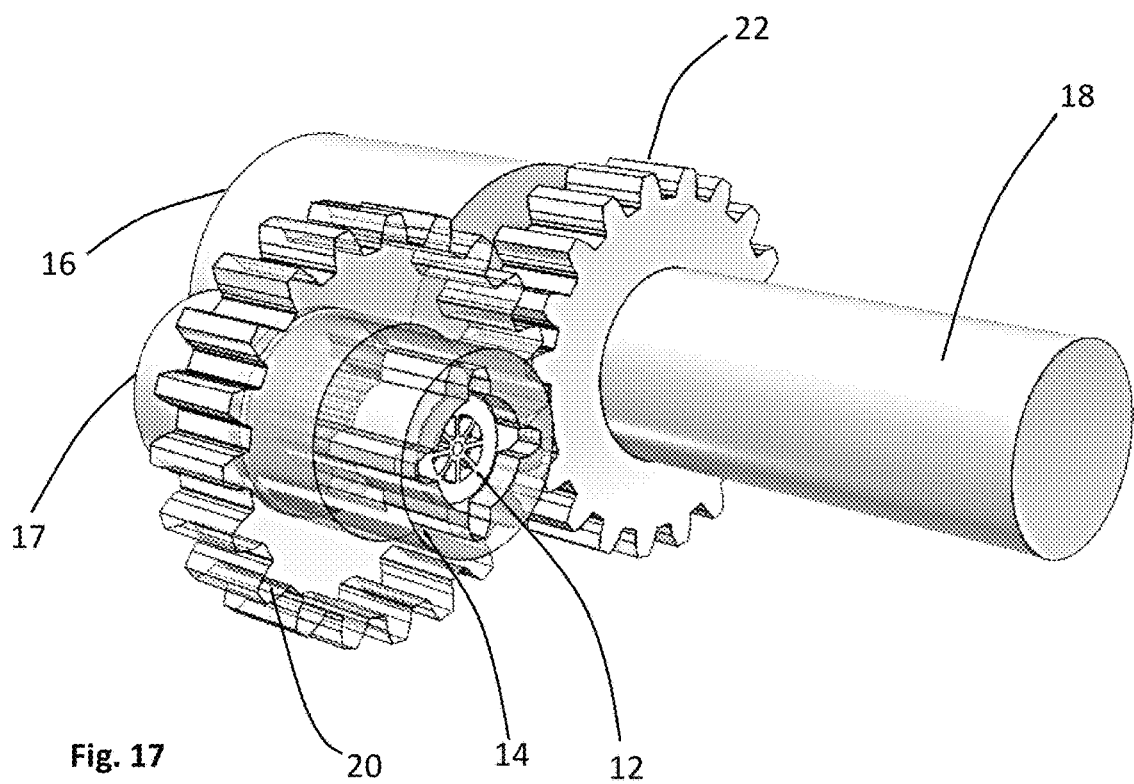
FIG. 17 is a side perspective view of FIG. 16.
Figure 18:
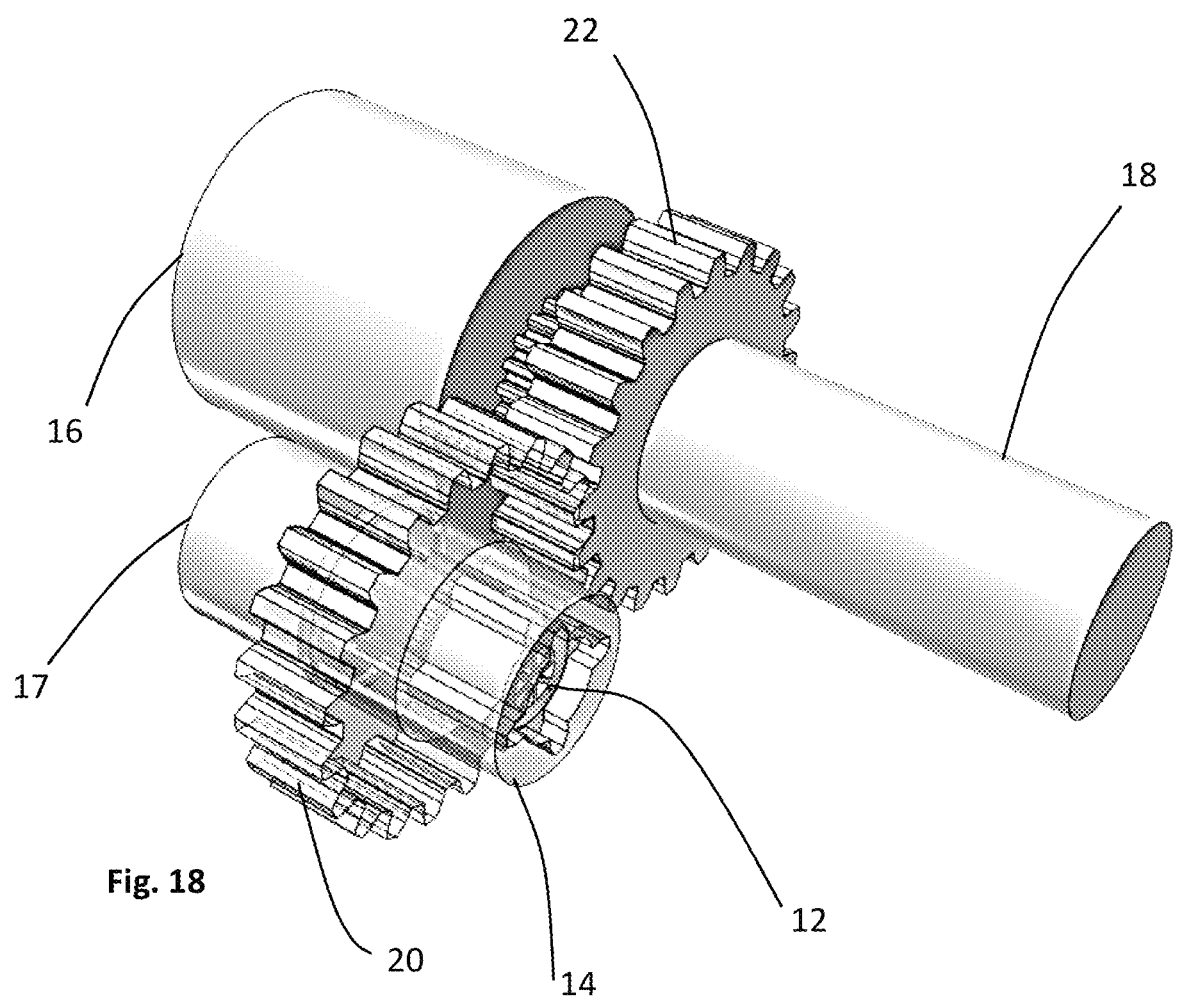
FIG. 18 is an upper perspective view of FIG. 16.

FIGS. 16-18 are perspective views illustrating an application of the switchable locking device in an engine transfer gear box or transfer case for 2WD to 4WD conversion. In these figures, external case 14 is depicted in semi-transparent form to allow observation of internal lock 12.

The arrangement of the transfer case in FIGS. 16-18 illustrates the interconnection and relative positions between switchable locking device 10 (internal lock 12 and external case 14), external rotation shaft 16 (main shaft), first output shaft (4WD) 17, second output shaft (2WD) 18 and corresponding gears 20 and 22. In this configuration, locking device 10 is connected to an engine itself represented by external rotation shaft 16 (main shaft) as described above with reference to FIGS. 2-7. Alternatively, locking device 10 can be connected to a rotor or gear that brings the power of an engine. The function of locking device 10 is to transmit the movement of rotation of an engine when locking device 10 is in the "ON" state (FIGS. 8-11) and to discontinue its rotation when locking device 10 is in the "OFF" state.

More specifically, the function of the arrangement shown in FIGS. 16-18 is as a shift shaft. Internal lock 12 slides into external case 14 to achieve the "ON" state (FIGS. 8-11) in which external case 14 is connected to first output shaft (4WD) 17 to transmit rotation for 2WD/4WD conversion. When internal lock 12 is to be placed in the "OFF" state, internal lock 12 is slid out from first output shaft (4WD) 17 and external case 14 is disconnected from first output shaft (4WD) 17 so that external case 14 can rotate freely (FIGS. 12-15).

By the foregoing arrangement shown in FIGS. 16-18, locking device 10 functions as a switchable interior gear that is switchable "ON" and "OFF" to connect one gear (i.e., external case 14) to another (i.e., first output shaft (4WD) 17) in the "ON" state and disconnect these two gears from each other in the "OFF" state. The design and shape of this configuration, including the internal gear connection and reduction in space as described above, makes this arrangement more effective as compared to conventional transfer gearbox arrangements. Since the connection of the gear is internal, the overall efficiency of the mechanical system is increased because the resulting coupling operates integrally as one piece as internal lock 12 is contained outside by external case 14 and inside by first output shaft (4WD) 17.

FIGS. 19-22 are cross-sectional side and perspective views illustrating a mechanism for activating switchable locking device 10, according to an exemplary embodiment of the present disclosure.

Figure 19:
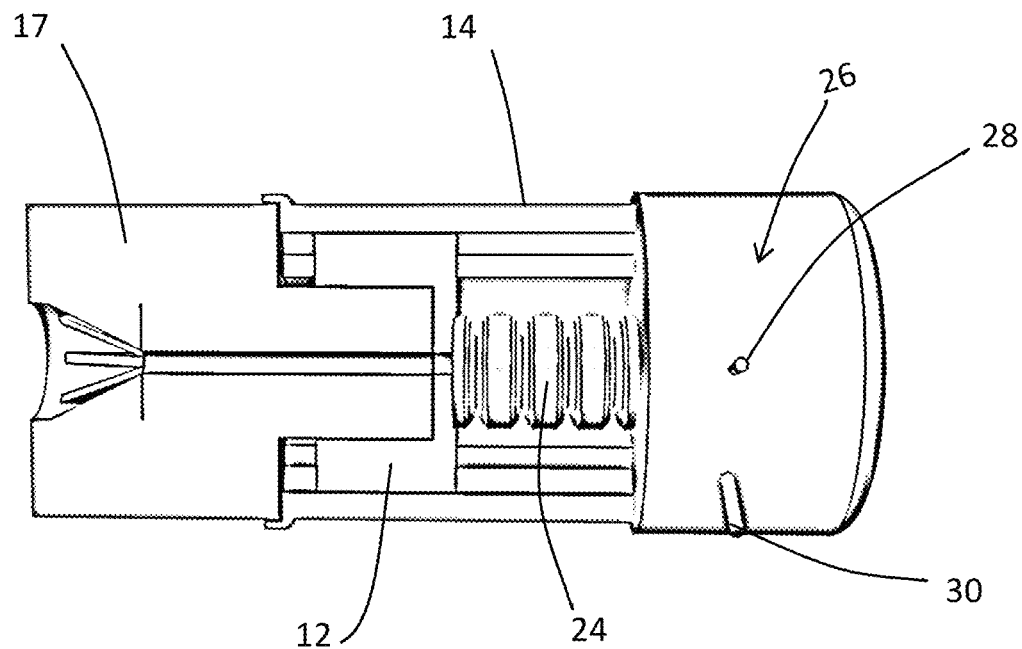
FIG. 19 is a cross-sectional side view showing the switchable locking device activated by a hydraulic pressure device and the internal lock in the "ON" state.
Figure 20:
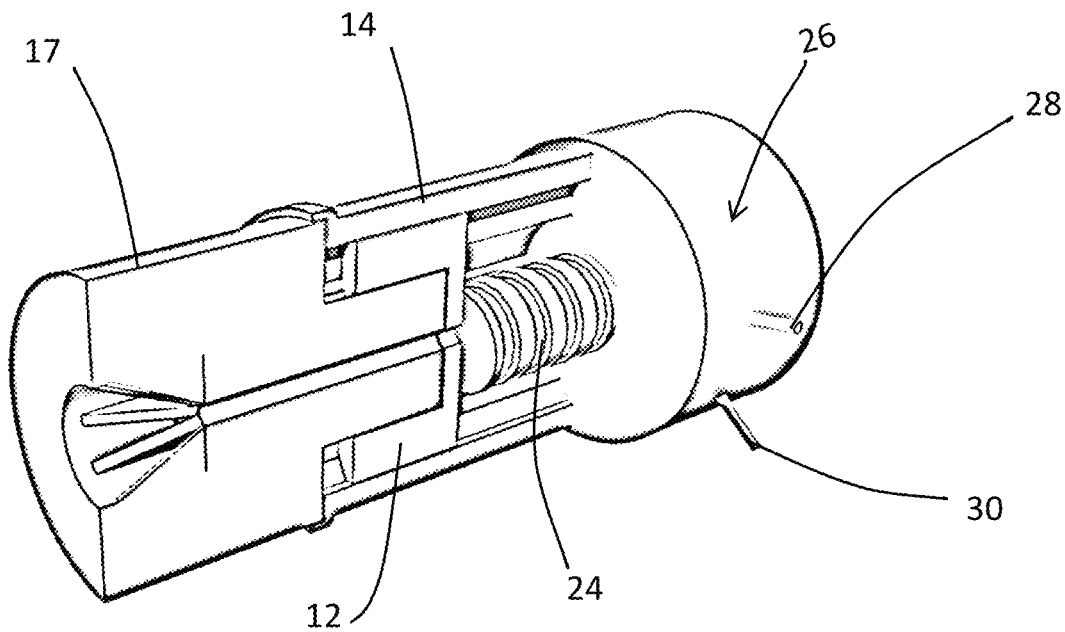
FIG. 20 is a rear cross-sectional perspective view of FIG. 19.
Figure 21:
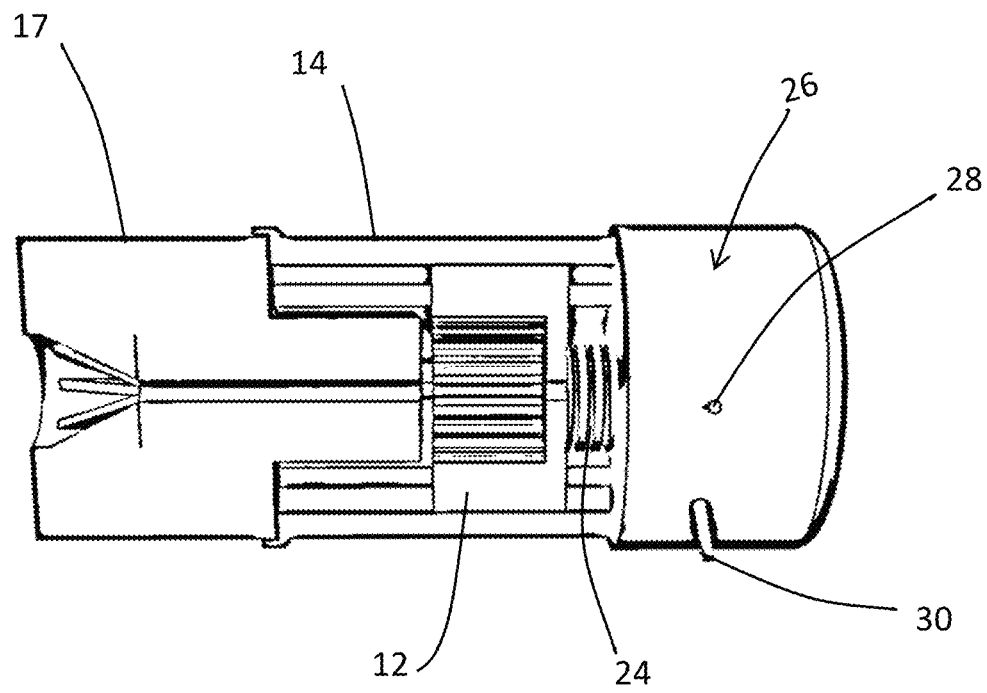
FIG. 21 is a cross-sectional side view showing the switchable locking device deactivated by the hydraulic pressure device and the internal lock in the "OFF" state.
Figure 22:
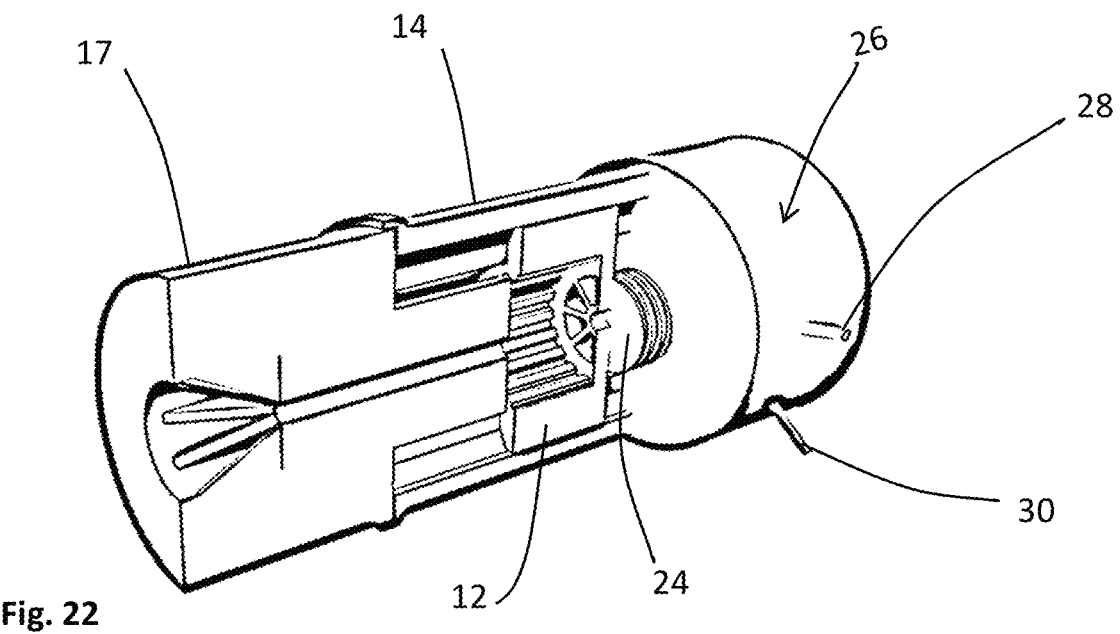
FIG. 22 is a rear cross-sectional perspective view of FIG. 21.

In FIGS. 19-22, internal lock 12 of locking device 10 is activated (i.e., placed between the "ON" and "OFF" states as described above) by means of a hydraulic system including a hydraulic piston 24 operated by a pressure device 26 with pressure in 28 and pressure out 28 ports. FIGS. 19 and 20 illustrate the configuration in which internal lock 12 is in the "ON" state, in which external case 14 is connected to first output shaft (4WD) 17 for transmission of rotation as described above. FIGS. 21-22 illustrate the configuration in which internal lock 12 is in the "OFF" state, in which external case 14 is not connected to first output shaft (4WD) 17 and external case 14 is able to rotate freely as described above.

It will be appreciated that the mechanism for activating switchable locking device 10 is not limited to a hydraulic system. For example, switchable locking device 10 can be activated by an electro-magnetic system or other suitable activation means without departing from the spirit and scope of the invention.

Another application of the switchable gear according to the present disclosure is described below with reference to FIGS. 23-29. In this application, the switchable locking device of the present disclosure is used like a stop or lock device for a static position.

Figure 23:
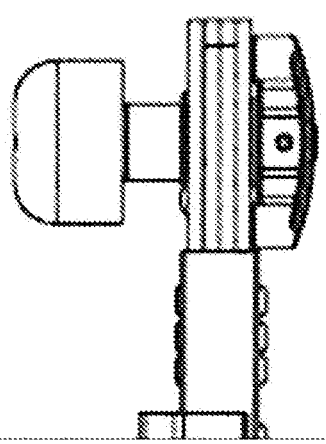
FIG. 23 is a diagrammatic view illustrating a conventional lock device in the closed state.
Figure 24:
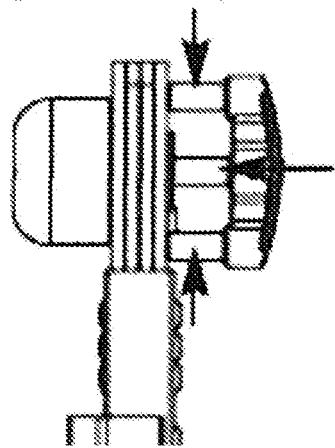
FIG. 24 is a diagrammatic view illustrating a conventional lock device in the open state.

FIGS. 23 and 24 are diagrammatic views illustrating a conventional stop or lock device for a folding multi-position ladder, with the lock device shown in the closed (FIG. 23) and open (FIG. 24) states. These conventional folding ladders can be placed in various adjustable angle positions with push knobs locking a hinge and also adjusted in height using spring loaded "J" locks, as well as use 3-position multi-locking hinges. However, these conventional stop or lock arrangements for folding multi-position ladders suffer from the problems that the adjustments cannot be accomplished with high efficiency and also the degree of adjustment (e.g., the number of angles in which the ladder can be locked) is rather limited.

FIGS. 25-28 are rear and side cross-sectional perspective views illustrating an application of the switchable locking device according to the present disclosure as a stop or lock device for a static position, such as for a folding multi-position ladder, which overcomes the foregoing drawbacks in the conventional art.

As shown in FIGS. 25-28, the lock device, generally designated with reference numeral 100, includes a locking gear 12 and case 14 corresponding to the internal gear and external case described above for switchable locking device 10, a main shaft 15, a push knob 32 and spring 34. As best shown in FIG. 29, main shaft 15 is provided with external locking teeth 15a.

Figure 25:
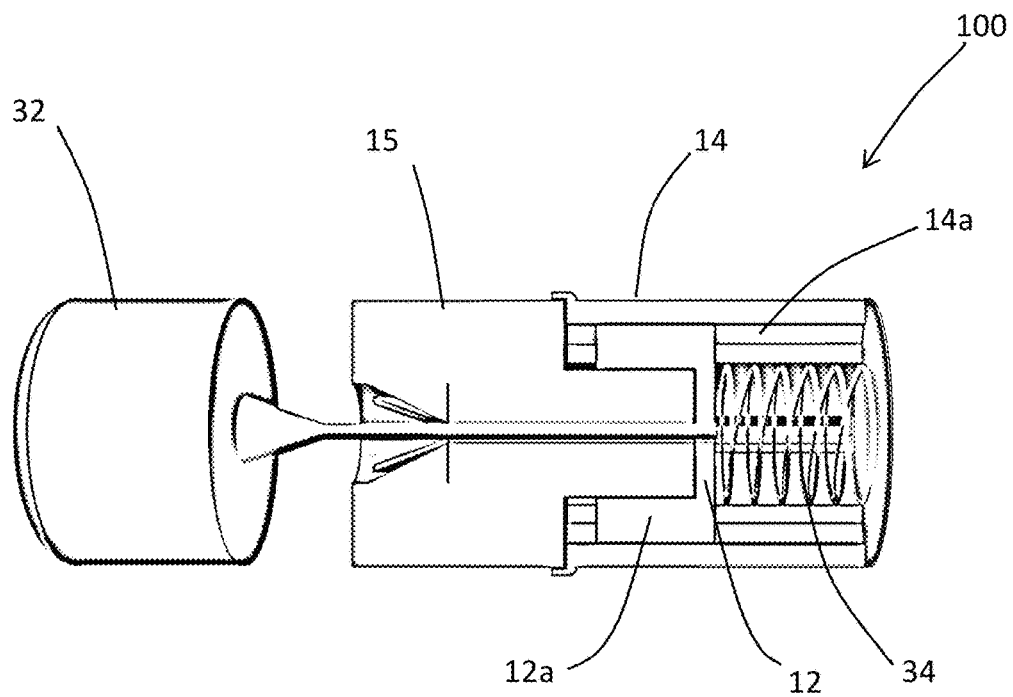
FIG. 25 is a cross-sectional side view illustrating an application of the switchable locking device as a lock device with the internal lock shown in the "ON" (closed) state.
Figure 26:
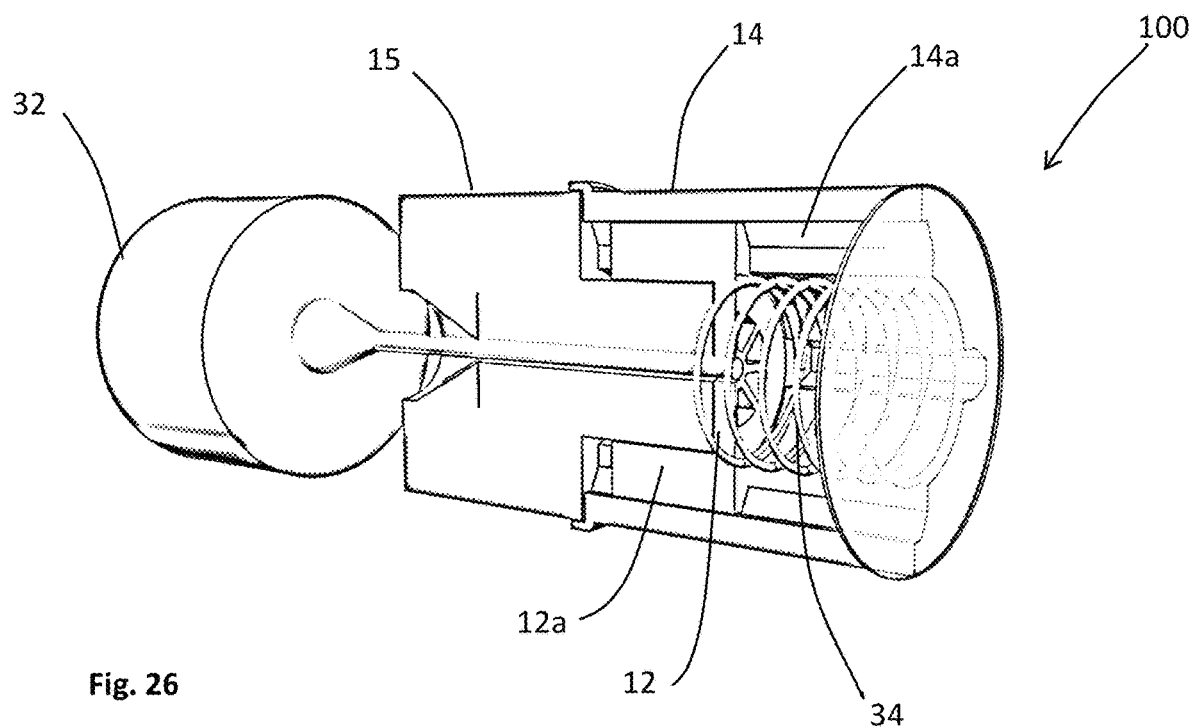
FIG. 26 is a rear cross-sectional perspective view of FIG. 25.
Figure 27:
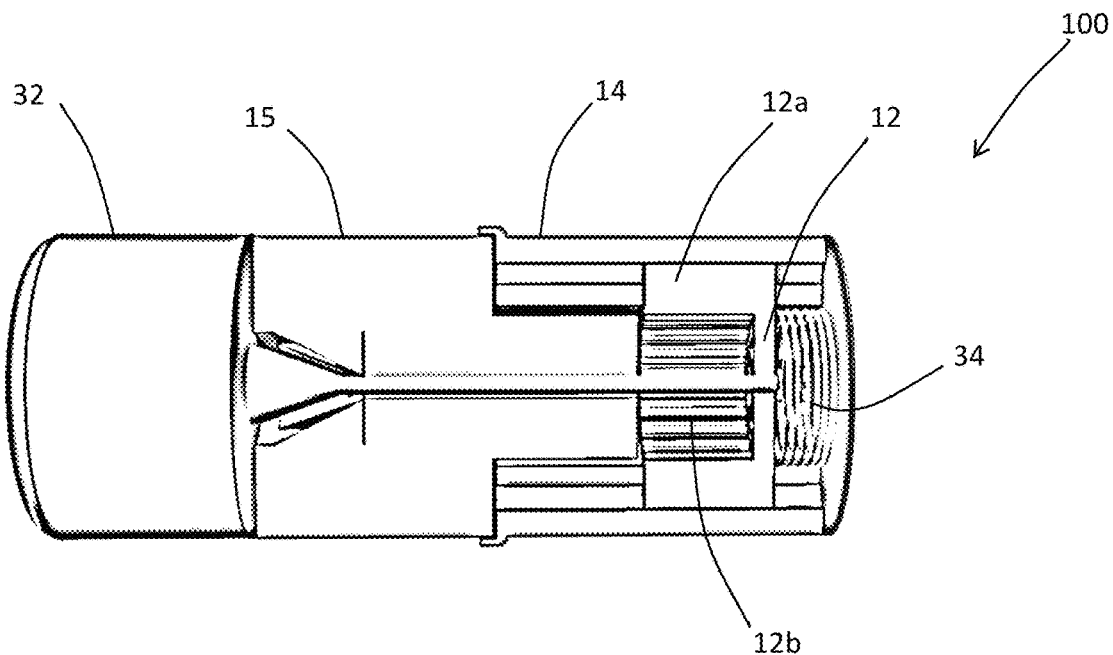
FIG. 27 is a cross-sectional side view similar to FIG. 25, but with the internal lock shown in the "OFF" (open) state.

FIGS. 25 and 26 show lock device 100 in a closed state in which locking teeth 12b of locking gear 12 are in meshing engagement with locking teeth 15a of main shaft 15 under the bias of spring 34 (in the left direction of FIG. 27). In this closed state, locking gear 12 is connected to main shaft 15 and case 14 is locked with main shaft 15, thereby preventing case 14 from undergoing rotation relative to main shaft 15.

Figure 28:
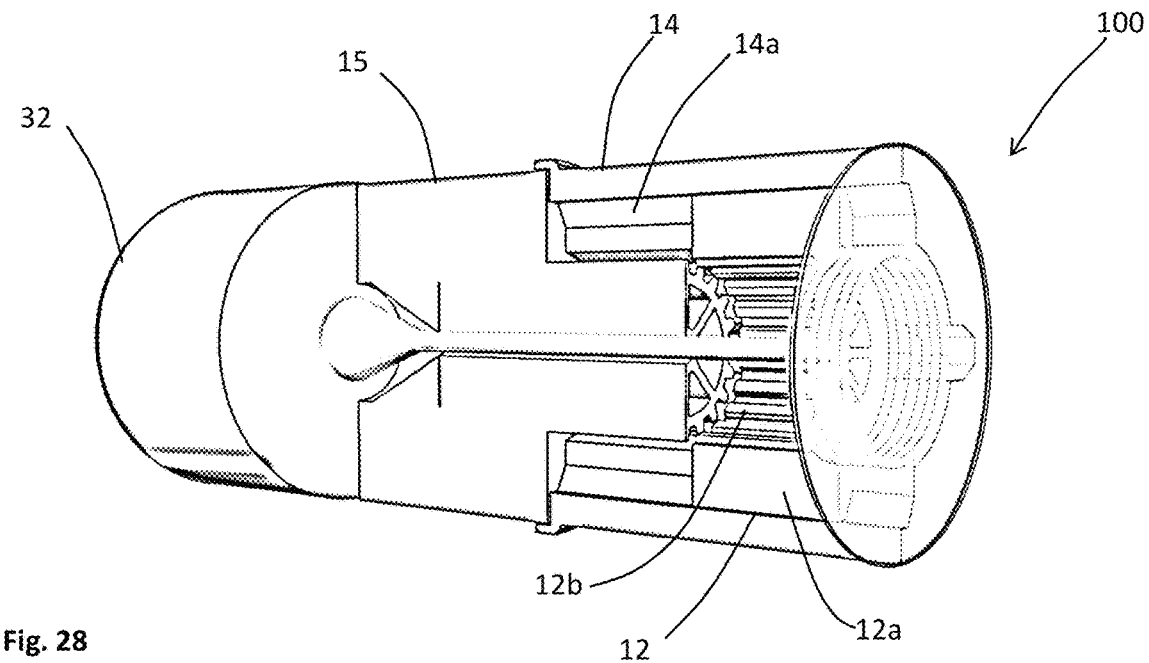
FIG. 28 is a rear cross-sectional perspective view of FIG. 27.
Figure 29:
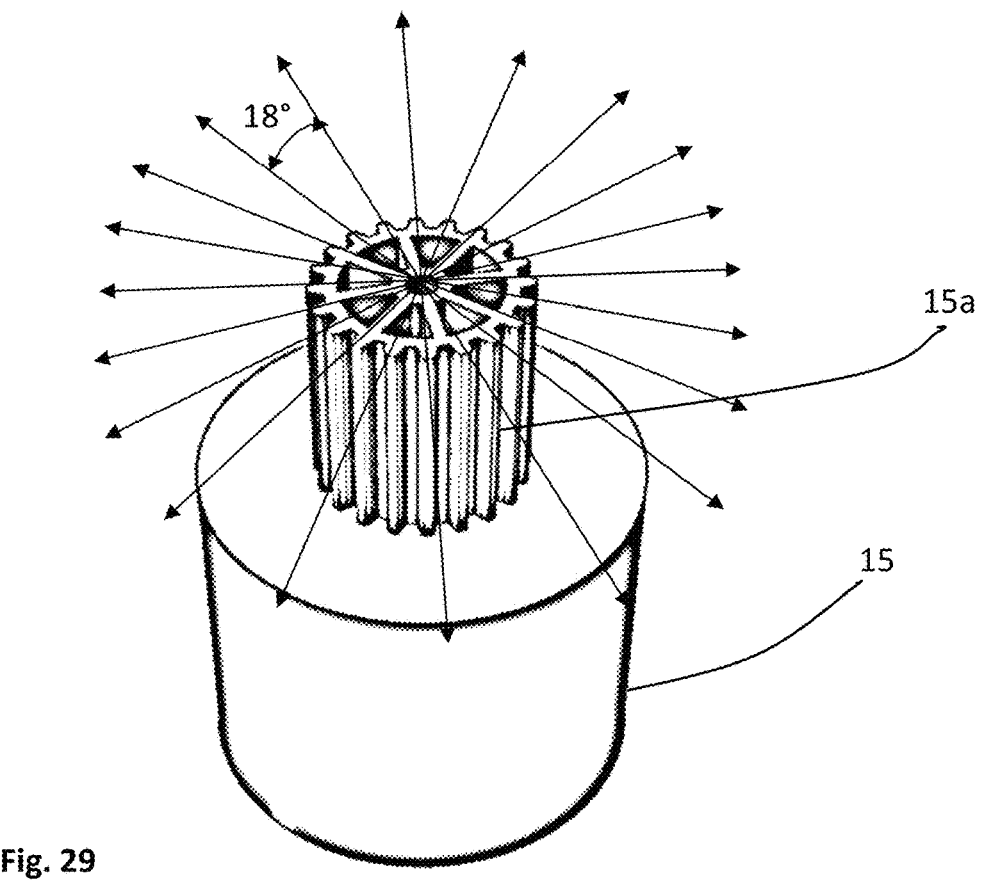
FIG. 29 is a top perspective view illustrating the various angular positions which can be achieved by the lock device incorporating a switchable locking device according to the present disclosure.

FIGS. 27 and 28 show lock device 100 in an open state in which locking teeth 12b of locking gear 12 are not in meshing engagement with locking teeth 15a of main shaft 15. In this open state, locking gear 12 is not connected to main shaft 15 and case 14 is not locked with main shaft 15, thereby enabling case 14 to freely rotate relative to main shaft 15.

During operation, lock device 100 is activated by manually pushing and releasing push knob 32. When not activated, the lock device 100 is in the closed state as described above (FIGS. 25-26). When activated, the lock device 100 is in the open state as described above (FIGS. 27-28). To activate lock device 100, push knob 32 is manually pushed so that locking gear 12 slides into case 14 (in the right direction of FIG. 27) against the bias of spring 34 until locking gear 12 is disconnected from main shaft 15 (i.e., by releasing the meshing engagement between locking teeth 12b of locking gear 12 and locking teeth 15a of main shaft 15), thereby placing locking device 100 in the open state. While in the open state, case 14 is able to freely rotate relative to main shaft 15 to place it in any of a multitude of selected angular positions relative to main shaft 15 as illustrated in FIG. 29, for example. When the selected angular position is achieved, push knob 32 is released and locking gear 12 is connected back to main shaft 15 by the action of spring 34 and the lock device 100 is again placed in the closed state as described above.

Figure 30:
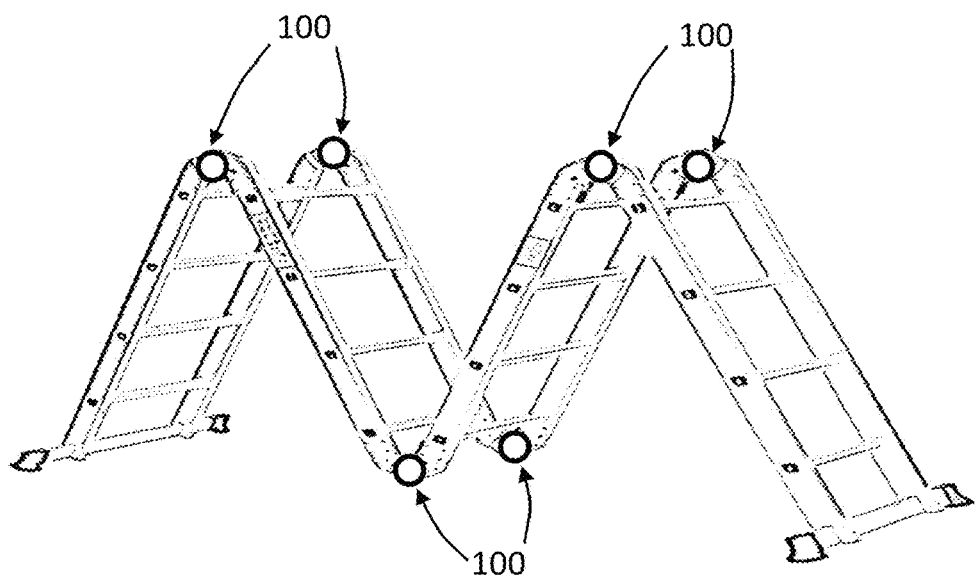
FIG. 30 illustrates various exemplary locations for the locking device according to the present disclosure in a folding multi-position ladder.

In an exemplary embodiment, locking device 100 according to the present disclosure can be applied at multiple locations of a folding multi-position ladder as illustrated in FIG. 30. Locking device 100 allows one to lock the ladder in a multitude of angular positions (e.g., as shown in FIG. 29) and with high efficiency as compared to conventional ladder lock mechanisms, such as described above with reference to FIGS. 23 and 24.

FIGS. 31-39 show another exemplary application of the switchable locking device according to the present invention. In FIGS. 31-39, the switchable locking device, generally designated at 200, is applied to two articulated components in the general form of an articulated arm 220 (first component) and articulated arm 224 (second component) configured to undergo angular movement relative to one another.

Figure 31:
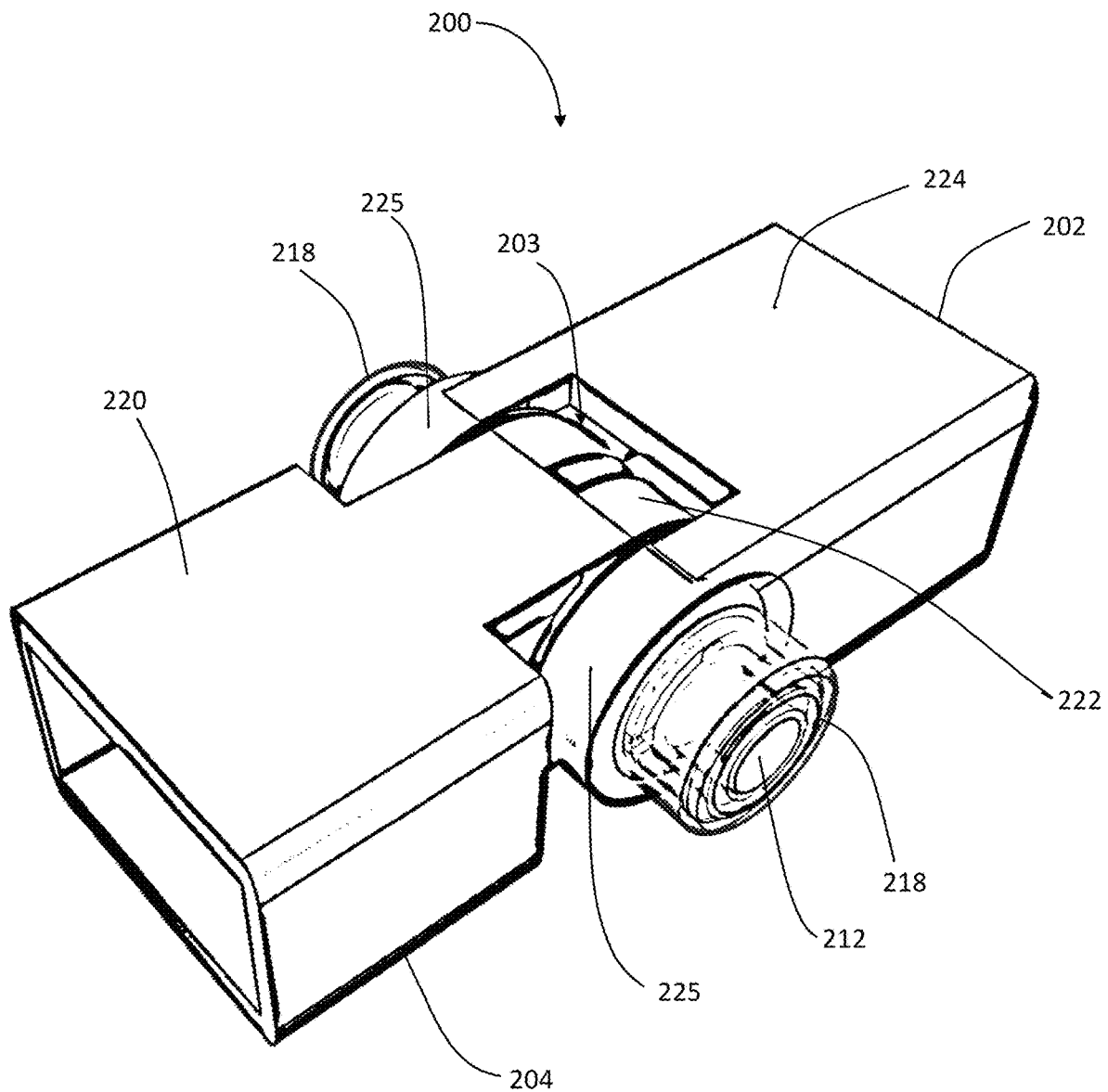
FIG. 31 is a perspective view illustrating a switchable locking device according to the present invention applied to articulated arms.
Figure 32:
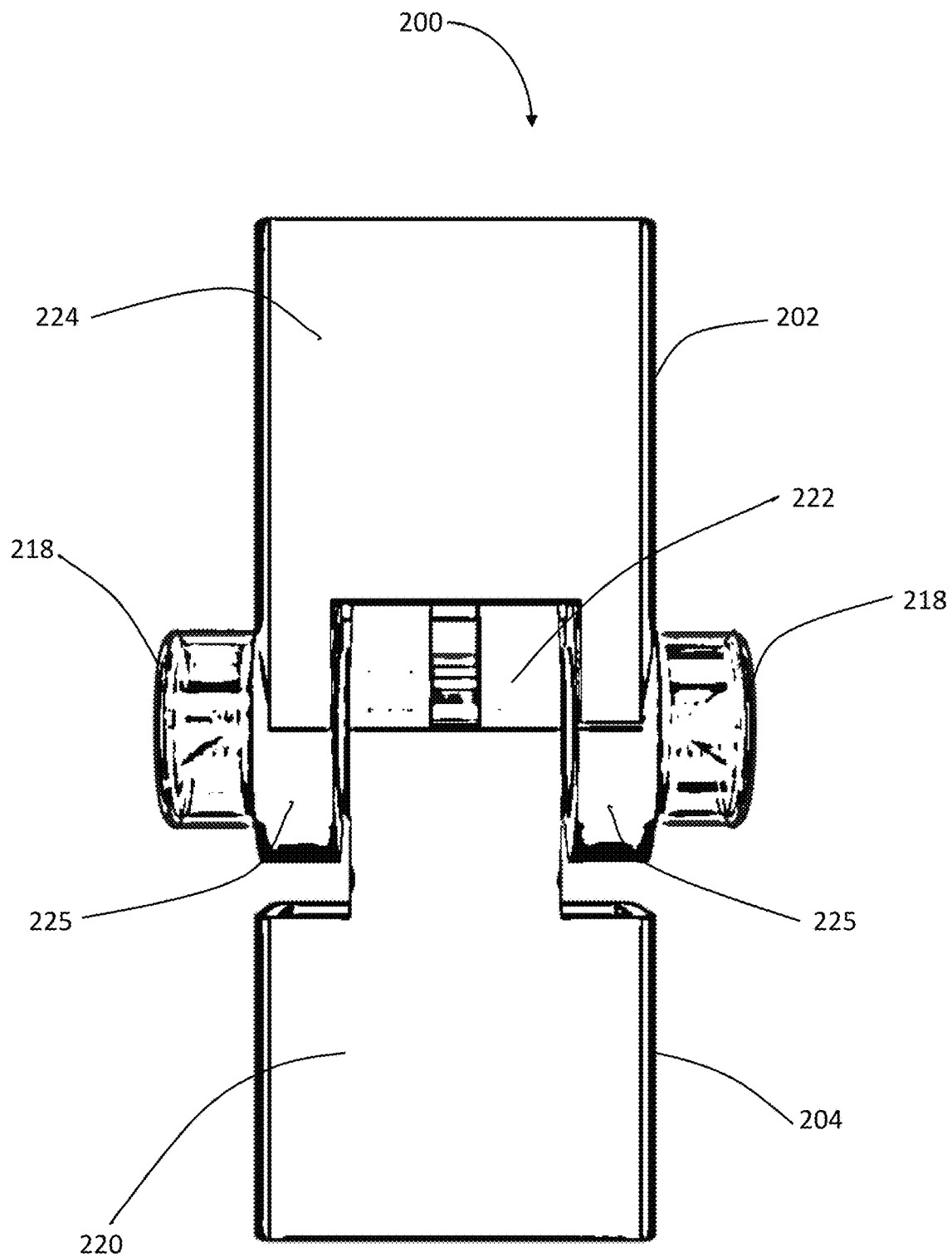
FIG. 32 is a top view of the switchable locking device shown in FIG. 31.

FIG. 31 is a perspective view and FIG. 32 is a top view of switchable locking device 200 shown in an assembled state. Articulated arms 220, 224 include respective arm portions 204, 202 configured to be connected to various elements or objects requiring articulation at various angles relative one another. In this embodiment, arm portions 202, 204 are provided with an opening configured to receive such elements or objects. For example, the openings are configured to receive suitable wooden or metal beams which are integrally connected to arm portions 202, 204 by friction fit, welding, clamping and/or using suitable fasteners such as nails, bolts and/or screws to form a support structure for a scaffold, for example. It will be appreciated that articulated arms 220, 224 can be used for structures other than scaffolds, such as platforms, support beams, etc. By this construction and arrangement, it is appreciated that switchable locking device 200 according to the present invention can hold, support and/or extend any elements or objects attached to articulated arms 220, 224 giving it the ability to position the elements or objects at different angles relative one another.

FIGS. 33-39 illustrate various disassembled states of switchable locking device 200 in partial perspective and exploded views showing the various components and corresponding structural and positional relationships thereof, as further described below.

Figure 33:
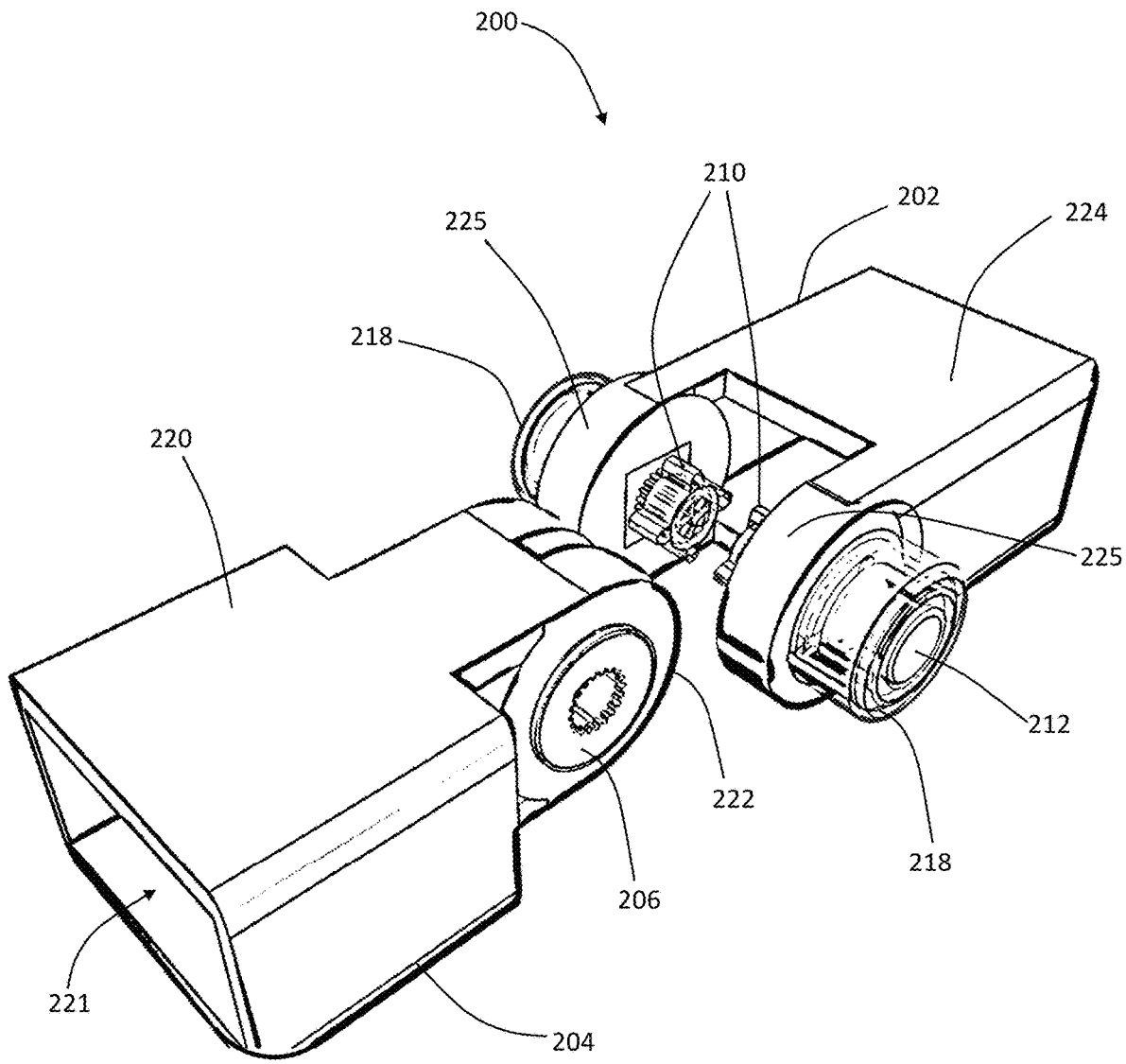
FIG. 33 is a perspective view similar to FIG. 31, with the articulated arms of the switchable locking device in a disconnected state.
Figure 37:
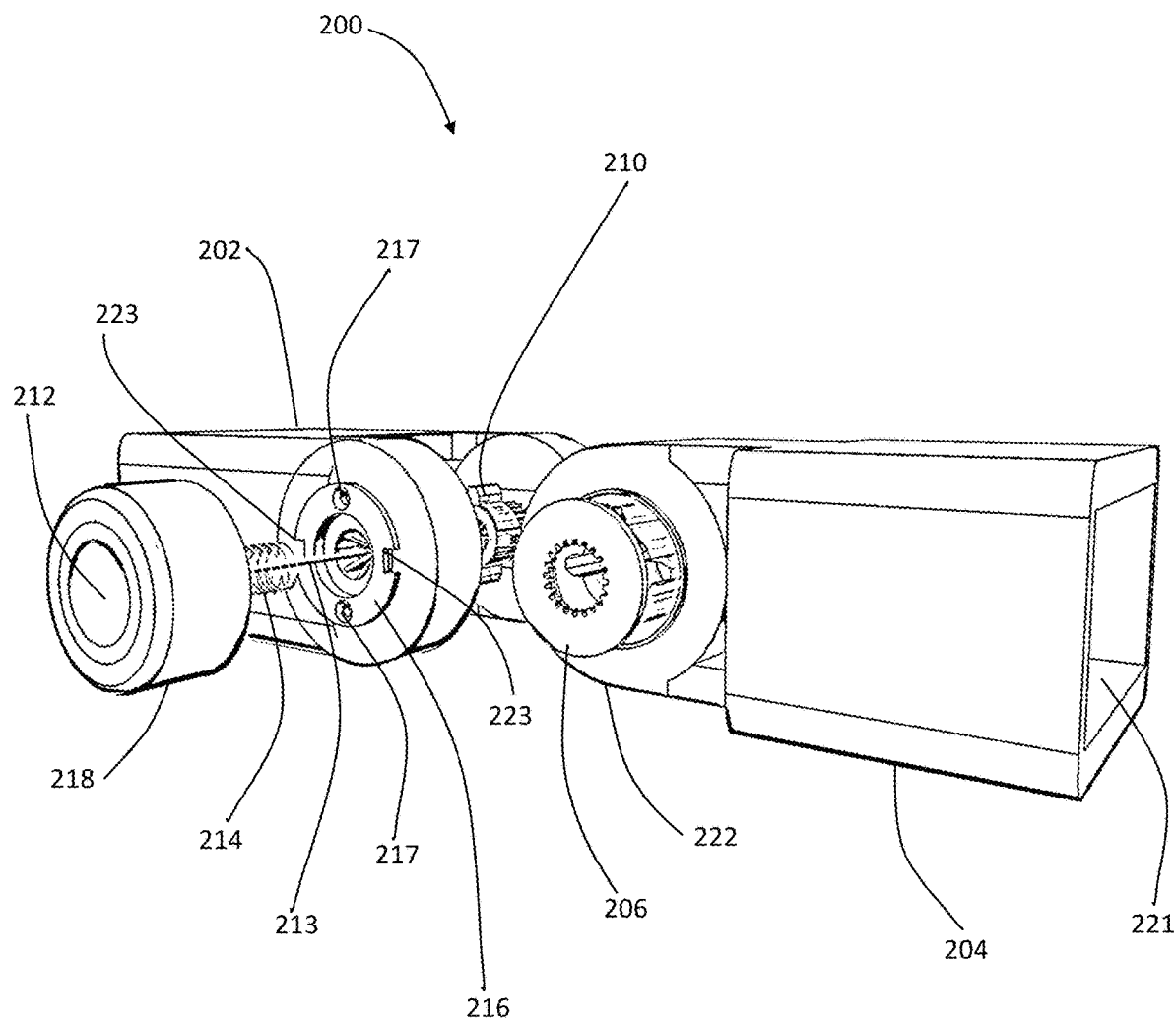
FIG. 37 is a side view in perspective of the switchable locking device shown in FIG. 34.
Figure 38:
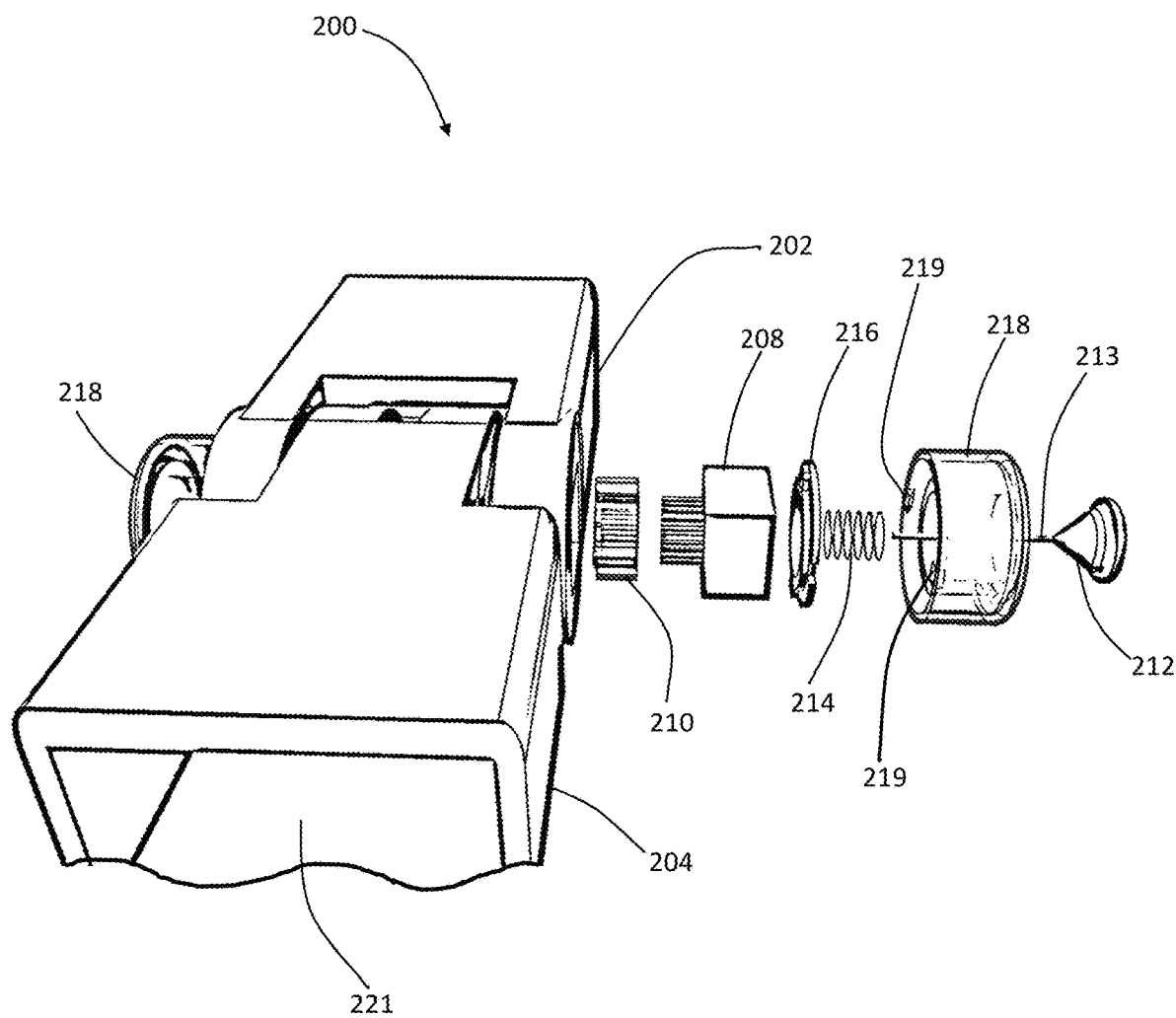
FIG. 38 is another exploded view in perspective illustrating a main shaft and switchable locking device removed from one of the articulated arms of the switchable locking device.
Figure 39:
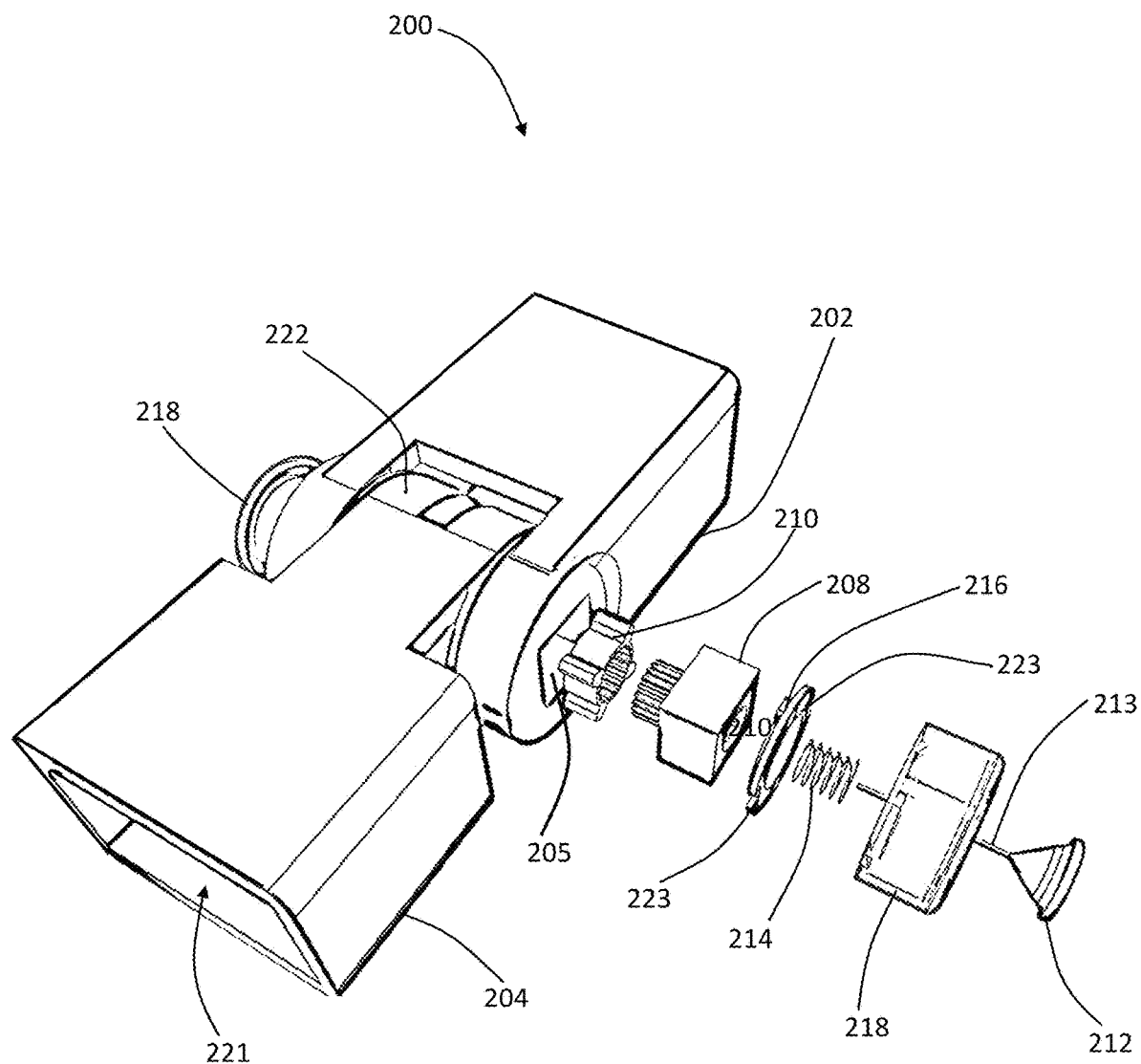
FIG. 39 is a right perspective view of the switchable locking device shown in FIG. 38.

Articulated arm 220 has a case 222 extending from arm portion 204. Case 222 has the same internal construction as external case 14 described above with reference to FIGS. 1-15. In this embodiment, case 222 is formed in one piece with arm portion 204. Alternatively, case 222 and articulated arm 220, including arm portion 204, may be separate components which are integrally connected together using suitable connecting means. As shown in FIGS. 33, 37 and 38, arm portion 204 is provided with opening 221 for receiving any element/object as described above.

Referring to FIGS. 31-36, articulated arm 224 is provided with two housing portions 225 extending from arm portion 202. In this embodiment, housing portions 225 are formed in one piece with arm portion 202. Alternatively, housing portions 225 and articulated arm 224, including arm portion 202, may be separate components which are integrally connected together using suitable connecting means. Housing portions 225 are spaced-apart from one another to form a space 203 therebetween, as shown in FIGS. 31 and 34-36. Space 203 is configured to receive and accommodate case 222 of articulated arm 222, in the manner shown in FIGS. 31, 32, 38 and 39, so as to permit articulated arms 220, 224 to be moved and placed at various angles relative one another.

Referring to FIGS. 33-39, case 222 is configured to receive and accommodate switchable locks 210 (hereinafter also "internal locks") each having the same construction (e.g., internal locking teeth) as internal lock 12 described above with reference to FIGS. 1-15. As described above for internal lock 12 and external case 14 in FIGS. 1-15, internal locks 210 and case 222 are configured so as to allow internal locks 210 to slide within and relative to case 222.

Figure 34:
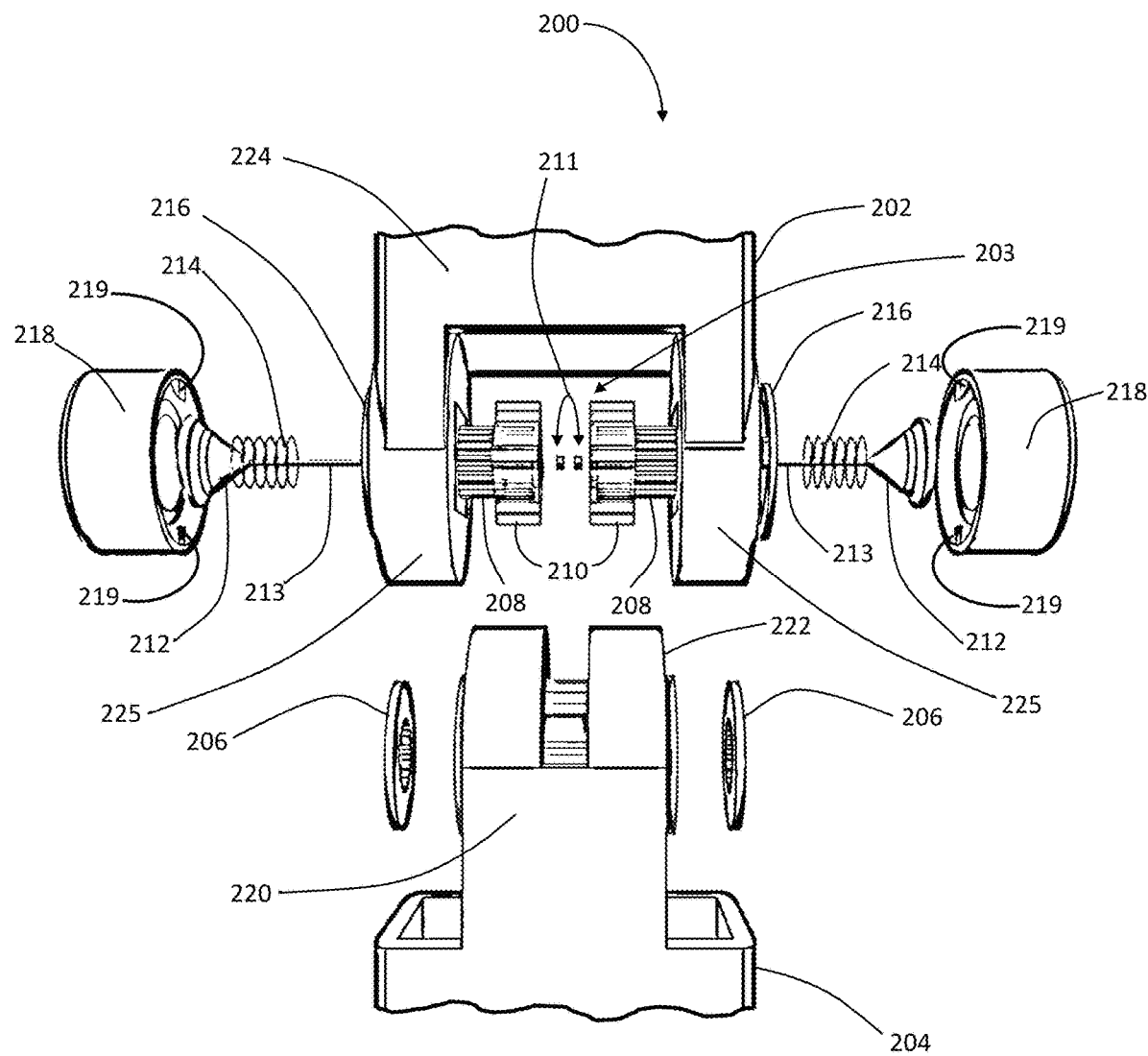
FIG. 34 is a top, partially exploded perspective view of the switchable locking device shown in FIG. 32.

Each housing portion 225 of articulated arm 224 is configured to receive and support therein a main shaft 208 which has the same general construction (e.g., external locking teeth) as main shaft 16 described above with reference to FIGS. 1-15. Each main shaft 208 is supported by and retained in corresponding housing portion 225 by a washer 206 so that the external locking teeth of each main shaft 208 extends into space 203 of articulated arm 224 as shown in FIG. 34, for example. Each washer 206 has internal locking teeth configured to mesh with the external locking teeth of the corresponding main shaft 208. In the assembled state of switchable locking device 200, an outer surface of each washer 206 engages a lip of case 222 while an inner surface of each washer 206 engages an outer side of the corresponding main shaft 208. By this construction, relative sliding movement between articulated arms 220, 224 is prevented.

In the assembled state of switchable locking device 200, a portion of the external locking teeth of each main shaft 208 is configured to extend into case 222 from opposite ends thereof for driving engagement with the internal locking teeth of the corresponding internal gear 210, as shown for example in FIGS. 33-37, when internal locking teeth of internal locks 210 are slid into engagement with the external locking teeth of respective main shafts 208 as further described below. In FIGS. 33-37, main shafts 208 and internal locks 210 are disposed outside of case 222 for illustration purposes only to show how these components are configured for driving engagement with one another while positioned inside of case 222.

Internal locks 210 are configured for undergoing sliding movement within and relative to case 222 to selectively place them into engagement with and disengagement from main shafts 208. In a first state of switchable locking device 200, internal locking teeth of internal locks 210 are disposed in meshing engagement with the external locking teeth of respective main shafts 208. In this first state, articulated arms 220, 224 are placed in a locked state and prevented from undergoing movement relative to one another. In a second state of switchable locking device 200, internal locking teeth of internal locks 210 are completely disengaged from the external locking teeth of respective main shafts 208. In this second state, articulated arms 220, 224 are placed in an unlocked state and are permitted to undergo movement relative one another to position the corresponding elements or objects attached to articulated arms 220, 224 at different angles relative one another.

Switchable locking device 200 is provided with switching means for switching between engagement and disengagement of internal locks 210 and main shafts 208 in the first and second states of switchable gear 200. Referring to FIGS. 34-39, the switching means comprises, for each internal gear 210, a push knob 212, a push rod 213 having one end connected to push knob 212 and another (opposite) end integrally connected to internal gear 210. For each internal gear 210, movement of push knob 212 in a direction towards (first direction) the corresponding housing portion 225 of articulated arm 224 causes internal gear 210 to slide inside case 222 in a direction which results in the disengagement of internal locking teeth of internal gear 210 from the external gears of the corresponding main shaft 208 to achieve the second state of switchable locking device 200 as describe above. Likewise, for each internal gear 210, movement of push knob 212 in a direction away (second direction) from the corresponding housing portion 225 of articulated arm 224 causes internal gear 210 to slide inside case 222 in a direction which results in the internal locking teeth of internal gear 210 coming into meshing engagement with the external gears of the corresponding main shaft 208 to achieve the first state of switchable locking device 200 as describe above.

In an exemplary embodiment, push rods 213 are in the form of threaded rods extending through a through hole of the corresponding main shaft 208 and securely threaded at one end to a threaded hole of the corresponding push knob 212. Each threaded rod 213 also engages the corresponding internal gear 210 and is securely retained thereto by a suitable fastener, (e.g., a threaded nut) denoted with reference numeral 211 in FIG. 34, that is securely engaged with the opposite end of threaded rod 213.

Each push knob 212 is associated with a biasing member 214 configured to bias push knob 212 in the second direction described above (i.e., in a direction away from the corresponding housing portion 225 of articulated arm 224) to maintain switchable locking device 200 in the first state. By this arrangement, pressing push knobs 212 in the first direction described above (i.e., against the bias of springs 214) cause internal locking teeth of internal locks 210 to disengage from external locking teeth of respective main shafts 208 to achieve the second state of switchable locking device 200 (i.e., permitting movement of articulated arms 220, 224 relative one another). In this embodiment, each biasing member 214 is in the form of a coil spring. It is understood, however, that other types of biasing members may be selected to perform the functions described without departing from the spirit and scope of the invention.

Referring to FIGS. 34-39, a stopper element 216 is securely mounted to an outer sidewall of each housing portion 225 for retaining the corresponding main shaft 208 within housing portion 225. Stopper element 216 is mounted to housing portion 225 using any suitable connecting means, such as by screws using holes 217 formed in stopper element 216.

Referring to FIGS. 31-29, removable knob covers 218 are provided for covering the respective push knobs 212. For each push knob 212, knob cover 218 has an opening providing access to a pressing surface of push knob 212, as shown in FIGS. 31, 33 and 37. Knob covers 218 also serve to prevent push knobs 212 from moving side to side and guide them during movement in the first and second directions as described above (i.e., to keep knob covers 218 aligned straight).

Figure 35:
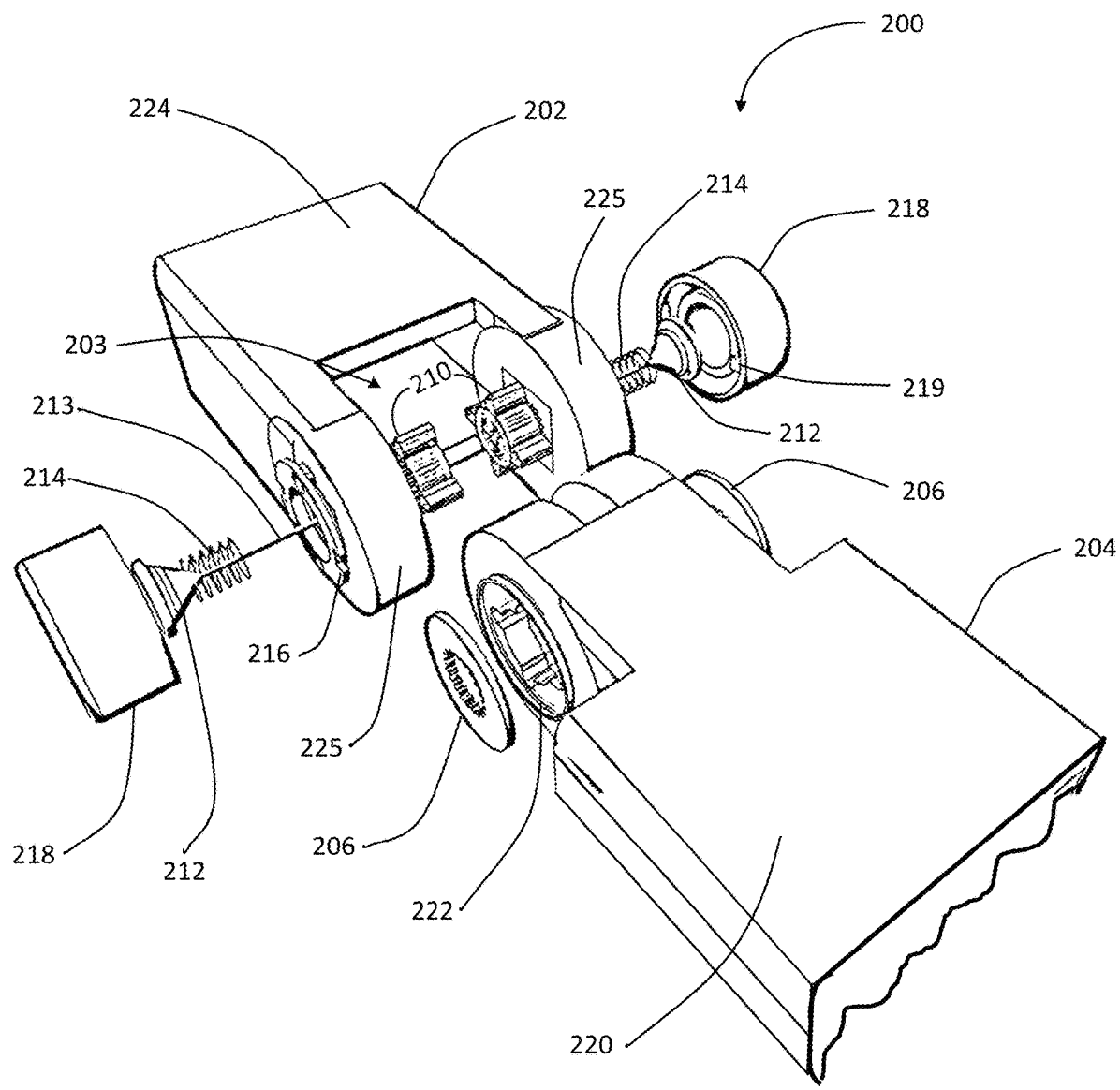
FIG. 35 is a left perspective view of the switchable locking device shown in FIG. 34.
Figure 36:
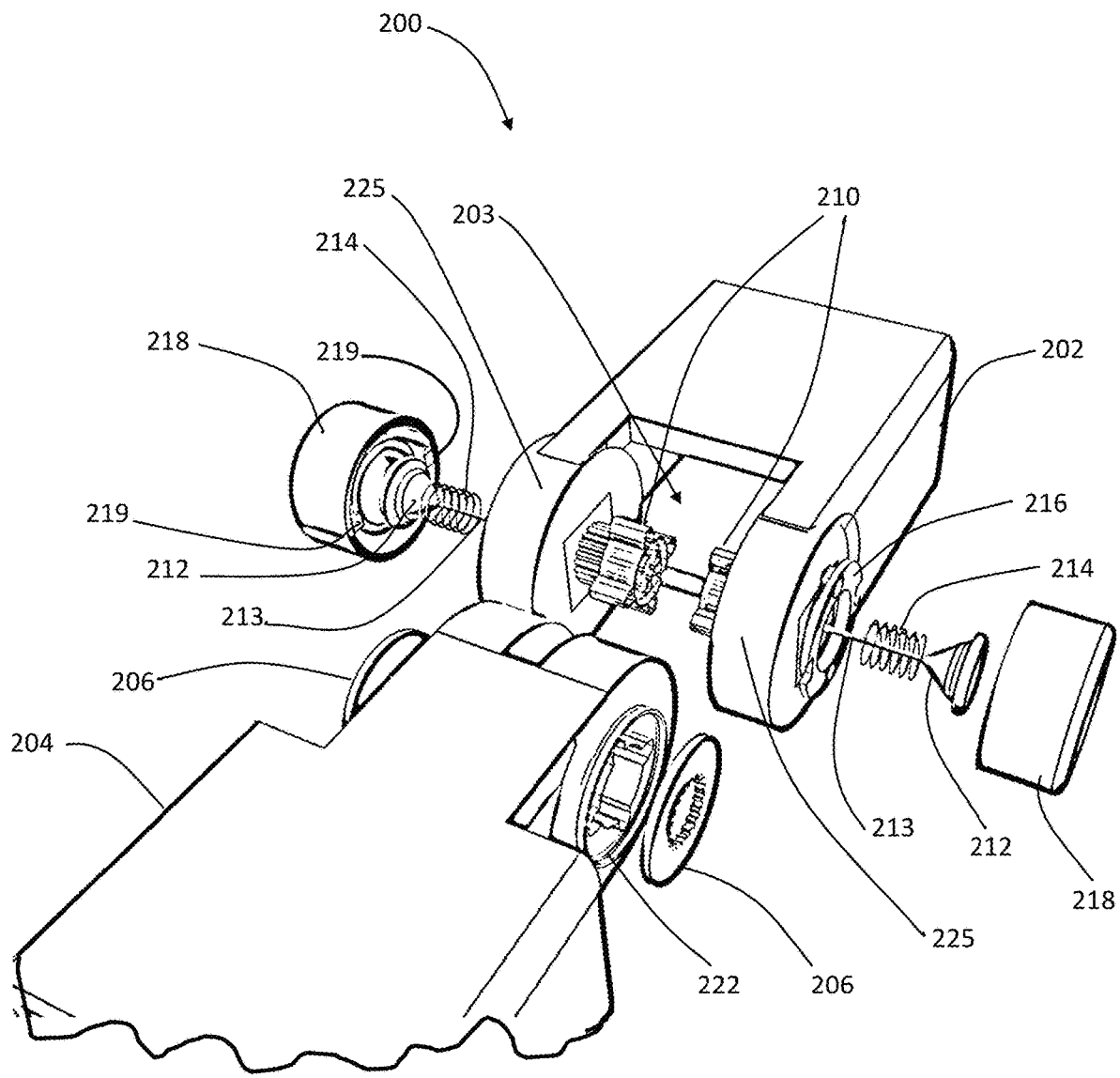
FIG. 36 a right perspective view of the switchable locking device shown in FIG. 34.

As best shown in FIGS. 34, 35 and 38, each knob cover 218 is provided with tab elements 219 configured for engagement with corresponding recessed portions 223 formed in stopper element 216 to removably mount knob cover 218 to stopper element 216.

FIGS. 31 and 32 show switchable locking device 200 in the first state described above, in which articulated arms 220, 224 are placed in a locked state and prevented from undergoing movement relative to one another. This is because in this first state the internal locking teeth of internal locks 210 are disposed in meshing engagement with the external locking teeth of respective main shafts 208 as described above. To switch switchable locking device 200 from the first state to the second state in which articulated arms 220, 224 are permitted to undergo movement relative one another, both push knobs 212 are pressed in the first direction (i.e., against the bias of biasing members 214) to cause internal locking teeth of internal locks 210 to slide inside case 222 until they are completely disengaged from the external locking teeth of respective main shafts 208. While push knobs 220, 224 are maintained in this pressed state, articulated arms 220, 224 can be moved relative one another to position the corresponding elements or objects attached to articulated arms 220, 224 at different preselected angles relative one another. After the desired relative angular position between elements or objects of the corresponding articulated arms 220, 224 is achieved, push knobs 212 are released by the biasing action of biasing members 214 (i.e., are caused to move in the second direction) to place switchable locking device 200 in the first state (i.e., to place articulated arms 220, 224 in the locked state). It will be appreciated that in the first and second states of switchable locking device 200, the engaging and disengaging actions between the main shafts 208 and corresponding internal locks take place inside case 222.

Without departing from the spirit and scope of the invention, it will be understood that the various components of the devices and systems according to the present disclosure described herein, including the switchable locking devices, transfer gear box and locking device, can be fabricated of any material required to achieve the intended purposes and functions. These materials include, for example, suitable metals such as steel and aluminum and as well as suitable plastic materials.

The previous description of the disclosure is provided to enable any person skilled in the art to make or use the disclosure. Various modifications to the disclosure will be readily apparent to those skilled in the art, and the generic principles defined herein may be applied to other variations without departing from the scope of the disclosure. Thus, the disclosure is not intended to be limited to the examples and designs described herein but are to be accorded the widest scope consistent with the principles and novel features disclosed herein.

What is claimed is:

1. A lock device comprising: a pair of locking elements each having internal locking teeth; a pair of shafts each having a portion provided with external locking teeth configured for meshing engagement with the internal locking teeth of respective ones of the pair of locking elements; a pair of housing portions configured to receive and retain respective ones of the pair of shafts; and a case configured to receive the pair of locking elements; wherein the locking elements are permitted to undergo sliding movement within the case between a first state of the lock device, in which the internal locking teeth of the pair of locking elements are disposed in meshing engagement with the external locking teeth of respective ones of the pair of shafts so that the case is not permitted to undergo rotational movement relative to the pair of shafts, and a second state of the lock device, in which the internal locking teeth of the pair of locking elements are not disposed in meshing engagement with the external locking teeth of respective ones of the pair of shafts so that the case is permitted to undergo rotational movement relative to the pair of shafts.

2. The lock device of claim 1; wherein in the first state of the lock device, the locking elements are maintained under a biasing action of respective biasing members positioned within the case.

3. The lock device of claim 2; further comprising a pair of push knobs configured for manual activation to push the respective locking elements against the bias of the biasing members to place the lock device in the second state.

4. The lock device of claim 3, wherein while the lock device is in the second state, the case is configured to freely rotate relative to the pair of shafts to place the case in any of a multitude of selected angular positions relative to the pair of shafts.

5. The lock device of claim 4, wherein when a selected angular position of the case is achieved, the pair of push knobs are configured to be released and the pair of locking elements are configured to undergo sliding movement by the biasing action of the biasing members so that the internal locking teeth of the pair of locking members engage the external locking teeth of the respective pair of shafts to place the lock device in the first state.

6. A folding multi-position ladder having the lock device of claim 1.

7. The lock device of claim 1; wherein the pair of housing portions are configured to partially receive and retain respective ones of the pair of shafts so that the portions of the pair of shafts provided with the external locking teeth extend out of the housing portions to permit meshing engagement with and disengagement from the internal locking teeth of the pair of locking elements in the respective first and second states of the lock device.

8. The lock device of claim 1; further comprising a pair of washers each having internal locking teeth for meshing engagement with the external locking teeth of respective ones of the portions of the pair of shafts so that the pair of shafts are retained by the housing portions.

9. A pair of articulation components having the lock device of claim 1 for permitting the pair of articulation components to undergo angular movement relative to one another, one of the pair of articulation components having the pair of housing portions and the other of the pair of articulation components having the case.

10. A folding multi-position ladder having the pair of articulation components according to claim 9.

11. The pair of articulation components of claim 9, wherein the lock device is symmetrical about a central axis of each of the pair of articulation components extending generally perpendicular to a longitudinal axis of each of the pair of shafts.

12. The lock device of claim 1, wherein the case comprises gear slots and each of the pair of locking elements has external locking teeth for meshing engagement with respective slots of the case to prevent rotational movement between the case and the pair of locking elements.

13. A lock device comprising:
a pair of locking elements each having internal locking teeth;
a pair of shafts each having a portion provided with external locking teeth configured for meshing engagement with the internal locking teeth of respective ones of the pair of locking elements;
a case configured to receive the pair of locking elements so that the locking elements are configured to undergo sliding movement in different directions along respective axes of the pair of shafts to selectively place the lock device in a first state, in which the internal locking teeth of the pair of locking elements are in meshing engagement with the external locking teeth of the respective pair of shafts so that the case is not permitted to undergo rotational movement relative to the pair of shafts, and a second state, in which the internal locking teeth of the pair of locking elements are not in meshing engagement with the external locking teeth of the respective pair of shafts to permit the case to undergo rotational movement relative to the pair of shafts;
a pair of housing portions spaced apart from one another to form a space therebetween configured to receive the case, the pair of housing portions being configured to receive and retain therein respective ones of the pair of shafts so that the portions of the pair of shafts provided with the external locking teeth extend into the space between the pair of housing portions;
a pair of biasing member members positioned within the case for biasing the pair locking elements in the direction in which the internal locking teeth of the pair of locking elements are placed in meshing engagement with the external locking teeth of the respective pair of shafts to place the lock device in the first state; and
a pair of push knobs configured for manual activation to push the respective pair of locking elements against the bias of the respective pair of biasing members to place the lock device in the second state so that the case is permitted to undergo rotational movement relative to the pair of shafts.

14. The lock device of claim 13, further comprising a pair of washers each having internal locking teeth for meshing engagement with the external locking teeth of respective ones of the portions of the pair of shafts so that the pair of shafts are retained by the respective housing portions.

15. The lock device of claim 14, wherein in the first state of the lock device, the case is not permitted to undergo rotational movement relative to the pair of shafts.

16. A pair of articulation components having the lock device of claim 13, one of the articulation components being integrally connected to the pair of housing portions and the other of the articulation components being integrally connected to the case; wherein in the first state of the lock device, the pair of articulation components are switched to a locked position in which the pair of articulation components are not permitted to undergo rotational movement relative one another; and wherein in the second state of the lock device, the pair of articulation components are switched to an unlocked position in which the pair of articulation components are permitted to undergo rotational movement relative to one another.

17. The pair of articulation components according to claim 16, wherein the pair of articulation components are configured for selective placement in various angular positions relative one another by switching between the locked and unlocked positions.

18. A folding multi-position ladder having the pair of articulation components according to claim 17.

19. The pair of articulation components of claim 16, wherein the lock device is symmetrical about a central axis of each of the pair of articulation components extending generally perpendicular to a longitudinal axis of each of the pair of shafts.

20. The lock device of claim 13, wherein the case comprises slots and each of the pair of locking elements comprises external locking teeth for meshing engagement with respective slots of the case to prevent rotational movement between the case and the pair of locking elements.

* * * * *